United States Patent
Breed et al.

(10) Patent No.: US 7,334,657 B2
(45) Date of Patent: *Feb. 26, 2008

(54) SIDE IMPACT SENSOR SYSTEMS

(75) Inventors: David S. Breed, Boonton Township, NJ (US); Vittorio Castelli, Yorkstown Heights, NY (US); Anthony S. Pruszenski, Jr., Newburyport, MA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,239

(22) Filed: Aug. 25, 2006

(65) Prior Publication Data

US 2007/0040363 A1    Feb. 22, 2007

Related U.S. Application Data

(63) Continuation of application No. 11/174,837, filed on Jul. 5, 2005, now Pat. No. 7,097,201, which is a continuation of application No. 10/963,390, filed on Oct. 12, 2004, now Pat. No. 7,025,379, which is a continuation of application No. 10/768,791, filed on Jan. 30, 2004, now Pat. No. 7,052,038, which is a continuation of application No. 09/435,045, filed on Nov. 8, 1999, now Pat. No. 6,685,218, which is a continuation-in-part of application No. 09/114,962, filed on Jul. 14, 1998, now Pat. No. 6,419,265, which is a continuation-in-part of application No. 08/101,017, filed on Sep. 16, 1993, now Pat. No. 5,842,716.

(51) Int. Cl.
*B60K 28/10* (2006.01)
*B60R 21/16* (2006.01)

(52) U.S. Cl. .................... 180/274; 280/730.2; 280/735

(58) Field of Classification Search ................ 280/735, 280/734, 730.1, 730.2; 180/274, 282
See application file for complete search history.

(56) References Cited

U.S. PATENT DOCUMENTS 1,624,418 A    4/1927  Marsh (Continued)

FOREIGN PATENT DOCUMENTS

DE    2249988    4/1974

(Continued)

OTHER PUBLICATIONS

"A Critique of Single Point Sensing", D. Breed et al., SAE Paper No. 920124, Feb. 1992.

(Continued)

*Primary Examiner*—Eric Culbreth
(74) *Attorney, Agent, or Firm*—Brian Roffe

(57) ABSTRACT

Side impact airbag system for a vehicle includes a side airbag arranged to deploy along a left or right side of the vehicle and an electronic crash sensor. The electronic crash sensor includes a housing, a mass arranged within the housing to be movable in a lateral direction relative to the housing in response to lateral accelerations of the housing, and a control mechanism for controlling deployment of the side airbag and which is responsive to the motion of the mass only in the lateral direction. The housing is mounted in such a position and a direction as to sense an impact into a side of the vehicle resulting in lateral acceleration of the housing. The electronic crash sensor may generate a signal representative of the movement of the mass.

28 Claims, 19 Drawing Sheets

U.S. PATENT DOCUMENTS

| | | |
|---|---|---|
| 2,369,977 A | 2/1945 | O'Toole |
| 2,477,933 A | 8/1949 | Labser |
| 2,806,737 A | 9/1957 | Maxwell |
| 2,816,188 A | 12/1957 | Stout |
| 2,997,557 A | 8/1961 | Gillmor |
| 3,037,809 A | 6/1962 | Praha |
| 3,097,272 A | 7/1963 | Hautly |
| 3,488,462 A | 1/1970 | Gianotto |
| 3,522,575 A | 8/1970 | Watson et al. |
| 3,601,081 A | 8/1971 | Smith |
| 3,623,768 A | 11/1971 | Capener |
| 3,633,939 A | 1/1972 | Evernham |
| 3,650,542 A | 3/1972 | Shimano |
| 3,663,035 A | 5/1972 | Norton |
| 3,690,695 A | 9/1972 | Jones, Sr. |
| 3,701,903 A | 10/1972 | Merhar |
| 3,706,463 A | 12/1972 | Lipkin |
| 3,732,944 A | 5/1973 | Kendall |
| 3,753,474 A | 8/1973 | Dillman |
| 3,762,495 A | 10/1973 | Usui |
| 3,768,832 A | 10/1973 | Schmidt |
| 3,774,714 A | 11/1973 | Usui |
| 3,778,572 A | 12/1973 | Matsui |
| 3,790,727 A | 2/1974 | Laserson et al. |
| 3,791,667 A | 2/1974 | Haviland |
| 3,796,441 A | 3/1974 | Fohl |
| 3,835,273 A | 9/1974 | Stolarik |
| 3,836,168 A | 9/1974 | Monaka |
| 3,844,581 A | 10/1974 | Fox |
| 3,859,482 A | 1/1975 | Matsui |
| 3,861,712 A | 1/1975 | Matsul et al. |
| 3,874,695 A | 4/1975 | Abe |
| 3,884,499 A | 5/1975 | Oka et al. |
| 3,888,329 A | 6/1975 | Monaghan |
| 3,917,023 A | 11/1975 | De Rosa |
| 3,940,164 A | 2/1976 | Non |
| 3,974,350 A | 8/1976 | Breed |
| 3,975,258 A | 8/1976 | Fox |
| 3,981,520 A | 9/1976 | Pulling |
| 4,013,851 A | 3/1977 | Abbondante |
| 4,028,516 A | 6/1977 | Hirashima et al. |
| 4,190,879 A | 2/1980 | Tissot |
| 4,191,399 A | 3/1980 | Garvey et al. |
| 4,201,898 A | 5/1980 | Jones et al. |
| 4,249,046 A | 2/1981 | Livers et al. |
| 4,262,177 A | 4/1981 | Paxton et al. |
| 4,299,406 A | 11/1981 | Thomas |
| 4,321,438 A | 3/1982 | Emenegger |
| 4,329,549 A | 5/1982 | Breed |
| 4,362,913 A | 12/1982 | Kumita et al. |
| 4,370,930 A | 2/1983 | Strasser et al. |
| 4,424,509 A | 1/1984 | Andres et al. |
| 4,477,732 A | 10/1984 | Mausner |
| 4,580,810 A | 4/1986 | Thuen |
| 4,666,182 A | 5/1987 | Breed |
| 4,708,364 A | 11/1987 | Doty |
| 4,711,466 A | 12/1987 | Breed |
| 4,816,627 A | 3/1989 | Janotik |
| 4,827,091 A | 5/1989 | Behr |
| 4,851,705 A | 7/1989 | Musser et al. |
| 4,873,452 A | 10/1989 | Morota et al. |
| 4,900,880 A | 2/1990 | Breed |
| 4,902,861 A | 2/1990 | Cook |
| 4,932,260 A | 6/1990 | Norton |
| 4,966,388 A | 10/1990 | Warner et al. |
| 4,980,573 A | 12/1990 | White et al. |
| 4,985,835 A | 1/1991 | Sterler et al. |
| 4,987,316 A | 1/1991 | White et al. |
| 4,995,639 A | 2/1991 | Breed |
| 5,010,216 A | 4/1991 | Sewell et al. |
| 5,010,217 A | 4/1991 | Hueniken et al. |
| 5,011,181 A | 4/1991 | Laucht et al. |
| 5,059,751 A | 10/1991 | Woodman et al. |
| 5,069,479 A | 12/1991 | Koide et al. |
| 5,072,966 A | 12/1991 | Nishitake et al. |
| 5,094,475 A | 3/1992 | Olsson et al. |
| 5,122,780 A | 6/1992 | Midorikawa et al. |
| 5,172,790 A | 12/1992 | Ishikawa et al. |
| 5,222,761 A | 6/1993 | Kaji et al. |
| 5,231,253 A | 7/1993 | Breed et al. |
| 5,233,141 A | 8/1993 | Breed |
| 5,273,309 A | 12/1993 | Lau et al. |
| 5,281,780 A | 1/1994 | Haland |
| 5,307,896 A | 5/1994 | Taguchi et al. |
| 5,318,145 A | 6/1994 | Vollmer |
| 5,390,951 A | 2/1995 | Iyoda |
| 5,392,024 A | 2/1995 | Kiuchi et al. |
| 5,431,440 A | 7/1995 | Spies et al. |
| 5,437,471 A | 8/1995 | Yoshida et al. |
| 5,483,447 A | 1/1996 | Jeenicke et al. |
| 5,566,974 A | 10/1996 | Mazur et al. |
| 5,842,716 A | 12/1998 | Breed |
| 6,015,162 A | 1/2000 | Spies et al. |
| 6,419,265 B1 | 7/2002 | Breed |
| 6,685,218 B1 | 2/2004 | Breed et al. |

FOREIGN PATENT DOCUMENTS

| | | |
|---|---|---|
| DE | 4026697 | 3/1992 |
| EP | 305655 | 3/1989 |
| GB | 1381999 | 1/1975 |
| GB | 2197973 | 6/1988 |
| GB | 2225660 | 6/1990 |
| GB | 2255535 | 11/1992 |
| JP | A H6-305392 | 1/1994 |
| JP | H6-331668 | 2/1994 |
| JP | A H6-135295 | 5/1994 |
| JP | A H6-144149 | 5/1994 |
| JP | A H6-147221 | 5/1994 |
| JP | A H6-59168 | 8/1994 |
| JP | A H6-59169 | 8/1994 |
| JP | A H6-293247 | 10/1994 |
| JP | A H7-2041 | 6/1995 |
| WO | WO 90/10302 | 9/1990 |

OTHER PUBLICATIONS

"Airbag Sysem for Side Impact Protection" of J.A. Olsson et al., 12th International Technical Conference on Experimental Safety Vehicles, Proceedings vol. 2, May 29-Jun. 1, 1989, pp. 976-983.
Inflatable Structures for Enhanced Side Impact Crash Protection, Collision Safety Engineering Inc.
SBIR Proposal 87-NH2, May 1, 1987, pp. 5-23.
Crash Protection in Near Side Impact, Advantages of a Supplemental Restraint, by C.Y. Warner et al.
SAE International Congress and Exposition, Feb. 27-Mar. 3, 1989.
Sensing Side Impacts, D.S. Breed e al., SAE Paper No. 940561, Feb. 28, 1994-Mar. 3, 2004.
Trends in Sensing Side Impacts, V. Castelli, SAE Paper No. 890603 Feb. 27, 1989-Mar. 3, 1989.
Side Impact Airbag System Technology, D.S. Breed, International Body Engineering Conference, Sep. 26, 1994-Sep. 29, 1994.
New Sensor Developments Leading to Sensor System Simplication, R. W. Diller, SAE Paper No. 841218, Oct. 1-4, 1984.
Sensing Side Impacts, D.S. Breed et al., SAE Paper No. 940561, Feb. 28, 1994-Mar. 3, 2004.
Trends in Sensing Side Impacts, V. Castell, SAE Paper No. 890603, Feb. 27, 1989- Mar. 3, 1989.
Side Impact Airbag System Technology, D.S. Breed, International Body Engineering Conference, Sep. 26, 1994-Sep. 29, 1994.

1401

SIDE IMPACT SENSOR SYSTEMS

CROSS REFERENCE TO RELATED APPLICATIONS

This application is a continuation of U.S. patent application Ser. No. 11/174,837 filed Jul. 5, 2005, now U.S. Pat. No. 7,097,201, which is a continuation of U.S. patent application Ser. No. 10/963,390 filed Oct. 12, 2004, now U.S. Pat. No. 7,025,379, which is a continuation of U.S. patent application Ser. No. 10/768,791 filed Jan. 30, 2004, now U.S. Pat. No. 7,052,038, which is a continuation of U.S. patent application Ser. No. 09/435,045 filed Nov. 8, 1999, now U.S. Pat. No. 6,685,218, which is a continuation-in-part of U.S. patent application Ser. No. 09/114,962 filed Jul. 14, 1998, now U.S. Pat. No. 6,419,265 which is a continuation-in-part of U.S. patent application Ser. No. 08/101,017 filed Sep. 16, 1993, now U.S. Pat. No. 5,842,716.

This application is related to U.S. patent application Ser. No. 11/058,337 filed Feb. 15, 2005, now U.S. Pat. No. 7,070,202, on the grounds that they include common subject matter.

All of the above-mentioned applications are incorporated herein by reference.

FIELD OF THE INVENTION

This invention relates to side impact crash sensors for vehicles and side impact airbag systems.

BACKGROUND OF THE INVENTION

Self-contained airbag systems contain all of the parts of the airbag system within a single package, in the case of mechanical implementations, and in the case of electrical or electronic systems, all parts except the primary source of electrical power and, in some cases, the diagnostic system. This includes the sensor, inflator and airbag. Potentially these systems have significant cost and reliability advantages over conventional systems where the sensor(s), diagnostic and backup power supply are mounted separate from the airbag module. In mechanical implementations in particular, all of the wiring, the diagnostic system and backup power supply are eliminated. In spite of these advantages, self-contained airbag systems have only achieved limited acceptance for frontal impacts and have so far not been considered for side impacts.

The "all-mechanical" self-contained systems were the first to appear on the market for frontal impacts but have not been widely adopted partially due to their sensitivity to accelerations in the vertical and lateral directions. These cross-axis accelerations have been shown to seriously degrade the performance of the most common all mechanical design that is disclosed in Thuen, U.S. Pat. No. 4,580,810. Both frontal and side impact crashes frequently have severe cross-axis accelerations.

Additionally, all-mechanical self contained airbag systems, such as disclosed in the Thuen patent, require that the sensor be placed inside of the inflator which increases the strength requirements of the inflator walls and thus increases the size and weight of the system. One solution to this problem appears in Breed, U.S. Pat. No. 4,711,466, but has not been implemented. This patent discloses a method of initiating an inflator through the use of a percussion primer in combination with a stab primer and the placement of the sensor outside of the inflator. One disadvantage of this system is that a hole must still be placed in the inflator wall to accommodate the percussion primer that has its own housing. This hole weakens the wall of the inflator and also provides a potential path for gas to escape.

Another disadvantage in the Thuen system that makes it unusable for side impacts, is that the arming system is sealed from the environment by an O-ring. This sealing method may perform satisfactorily when the module is mounted in the protected passenger compartment but it would not be satisfactory for side impact cases where the module would be mounted in the vehicle door where it can be subjected to water, salt, dirt, and other harsh environments.

Self-contained electrical systems have also not been widely used. When airbags are used for both the driver and the passenger, self-contained airbag systems require a separate sensor and diagnostic for each module. In contrast to mechanical systems, the electronic sensor and diagnostic systems used by most vehicle manufacturers are expensive. This duplication and associated cost required for electrical systems eliminates some of the advantages of the self contained system.

Sensors located in the passenger compartment of a vehicle can catch most airbag-required crashes for frontal impacts, particularly if the occupants are wearing seatbelts. However, researchers now believe that there are a significant number of crashes which cannot be sensed in time in the passenger compartment and that this will require the addition of another sensor mounted in the crush zone (see, for example, Breed, D. S., Sanders, W. T. and Castelli, V. "A Critique of Single Point Sensing", Society of Automotive Engineers Paper No. 920124). If true, this will eventually eliminate the use of self-contained airbag systems for frontal impacts.

Some of these problems do not apply to side impacts mainly because side impact sensors must trigger in a very few milliseconds when there is no significant signal at any point in the vehicle except where the car is crushing or at locations rigidly attached to this crush zone. Each airbag system must be mounted in the crush zone and generally will have its own sensor. Self contained airbag systems have heretofore not been used for occupant protection for side impacts which is largely due to the misconception that side impact sensing requires the use of elongated switches as is discussed in detail in U.S. Pat. No. 5,231,253, incorporated by reference herein. These elongated prior art side impact crush-sensing switches are not readily adaptable to the more compact self-contained designs. The realization that a moving mass sensor was the proper method for sensing side impacts has now led to the development of the side impact self contained airbag system of this invention. The theory of sensing side impacts is included in the '253 patent referenced above.

In electro-mechanical and electronic self-contained modules, the backup power supply and diagnostic system are frequently mounted apart from the airbag system. If a wire is severed during a crash but before the airbag deploys, the system may lose its power and fail to deploy. This is more likely to happen in a side impact where the wires must travel inside of the door. For this reason, mechanical self-contained systems have a significant reliability advantage over conventional electrical systems.

Finally, the space available for the mounting of airbag systems in the doors of vehicles is frequently severely limited making it desirable that the airbag module be as small as possible. Conventional gas generators use sodium azide as the gas generating propellant. This requires that the gas be cooled and extensively filtered to remove the sodium oxide, a toxic product of combustion. This is because the gas is exhausted into the passenger compartment where it can burn an occupant and is inhaled. If the gas is not permitted to enter the passenger compartment, the temperature of the gas can be higher and the products of combustion can contain toxic chemicals, such as carbon dioxide.

These and other problems associated with self-contained airbag systems and side impact sensors are solved by the invention disclosed herein.

OBJECTS AND SUMMARY OF THE INVENTION

This invention is concerned with a novel self-contained airbag system for protecting occupants in side impacts. It is also concerned with the sensors used either with self-contained modules or apart from the airbag module. This may be accomplished by using the sensors described in U.S. Pat. No. 5,231,253 referenced above, along with other improvements described in detail below. This invention is secondarily concerned with applying some of the features of the novel side impact system to solving problems of prior art mechanical airbag systems, e.g., those discussed above. The sensitivity to cross axis accelerations of current all mechanical airbag systems, for example, is solved in the present invention, as discussed in U.S. Pat. No. 5,233,141, incorporated by reference herein, through the substitution of a hinged sensing element for the ball sensing mass in the Thuen patent.

Problems resulting from the hole in the inflator wall when a percussion primer is used as in Breed, U.S. Pat. No. 4,711,466, are solved in the present invention through the placement of sensitive pyrotechnic material in a cavity adjacent to the outside wall of the inflator and then using shock from a stab primer to initiate the pyrotechnic material and thus the inflator. An alternate solution, as discussed below, is to make the size of the hole created in the inflator by the action of the stab primer small so that the total quantity of gas which escapes into the sensor is small compared with the quantity of gas used to inflate the airbag.

Finally, in the self-contained airbag system disclosed herein, provision is made to exhaust the gas outside of the passenger compartment, into the vehicle doors, or other side areas of the vehicle. This permits the use of higher gas temperatures and alternate propellant formulations, such as nitro-cellulose, which produce toxic combustion products. Both of these changes reduce the size, weight and cost of the system.

The sensors used here are either electronic, electro-mechanical or mechanical but all have a movable mass where the motion of the mass is sensed either electronically or mechanically.

Principal objects and advantages of one or more of the inventions disclosed herein are:

1. To provide a self contained side impact occupant protection airbag system incorporating the advantages of a movable mass sensor resulting in a low cost, compact airbag system.
2. To provide a frontal impact all mechanical airbag system incorporating a hinged sensing mass to eliminate the effects of cross-axis accelerations on the operation of the sensor.
3. To provide a method of minimizing the leakage of the inflator gases out of the inflator portion of a self contained airbag system into the sensor portion and the associated problems.
4. To provide a side impact airbag system which utilizes the crush of the vehicle side to arm the sensor and motion of a sensing mass to initiate deployment.
5. To provide a method of hermetically sealing a self contained airbag system while permitting an external force to be used to arm the system.
6. To provide a more compact self contained side impact airbag system by providing for the exhausting of the airbag gas into the vehicle door or side, therefore permitting the use of higher temperature gas and propellants which would otherwise not be viable due to their toxic products.
7. To provide an all-mechanical airbag system utilizing a cantilevered firing pin spring which also provides the biasing force on the sensing mass thereby providing a simplified design.
8. To provide an all-mechanical airbag system with a thin sensor mounted outside of the inflator housing but in line with it to reduce the size of the system and permit the use of conventional inflator designs.
9. To provide a highly reliable side impact occupant protection electro-mechanical self-contained airbag system.
10. To provide a highly reliable side impact occupant protection electronic self contained airbag system.
11. To provide a method of obtaining the power for an electrical self contained airbag system from other components within the door thereby minimizing the requirement for separate wiring for the airbag system.
12. To provide a power supply within the self contained module and a simplified diagnostic system for an electrical self contained airbag system.
13. To provide a self contained airbag system design that permits the arming of the sensor after it has been mounted onto the vehicle but before the inflator is mounted to provide greater safety against unwanted deployments.
14. To provide an electronic, electro-mechanical or mechanical sensor for use with either a self-contained airbag system or conventional airbag system wherein the sensor system senses the acceleration of the vehicle member on which it is mounted and where in the sensed acceleration is the crush zone acceleration and is used to control the deployment of the side airbag.

Other objects and advantages will become apparent from the discussion below.

In order to achieve at least one of the objects noted above, a first embodiment of a vehicle in accordance with the invention has a longitudinal axis between a front and rear of the vehicle such that a lateral direction is defined perpendicular to the longitudinal axis, a right side and a left side spaced apart in the lateral direction, and a side impact airbag system which includes a side airbag arranged to deploy along the left or right side of the vehicle and an electronic crash sensor. The electronic crash sensor includes a housing, a mass arranged within the housing in a position and direction so as to be movable in the lateral direction relative to the housing in response to lateral accelerations of the housing, and a control mechanism for controlling deployment of the side airbag and which is responsive to the motion of the mass only in the lateral direction. The housing is mounted in such a position and a direction as to sense an impact into a side of the vehicle resulting in lateral acceleration of the housing, e.g. by an appropriate mounting mechanism.

The electronic crash sensor may generate a signal representative of the movement of the mass. It may include a microprocessor and an algorithm for determining whether movement over time of the mass results in a calculated value which is in excess of a threshold value. The housing may be arranged in a door on the right or left side of the vehicle.

Another embodiment of a vehicle in accordance with the invention includes a longitudinally extending outer skin arranged on a side of the vehicle, a system housing arranged inward of the outer skin and having an opening facing a portion of a passenger compartment of the vehicle, an inflatable airbag arranged in the system housing, an inflator arranged in connection with the system housing, and an electronic sensor system for detecting an impact into a side of to the vehicle. The electronic sensor system includes a sensor housing and a mass arranged in the sensor housing and movable relative to the sensor housing in response to acceleration, movement of the mass relative to the sensor housing providing an indication of a side impact for which deployment of the airbag is desired. The inflator is actuated in response to a detected side impact by the sensor system in order to expel the airbag through the opening into the passenger compartment. The sensor system is arranged such that the inflator is actuated and the airbag is inflated and expelled through the opening into the passenger compartment based on movement of the mass.

The vehicle may include an inner skin having a portion alongside the passenger compartment of the vehicle, in which case, the system housing is arranged between the outer and inner skins of the vehicle and the opening of the system housing is situated on an inward facing side of the system housing. The system housing is mounted such that the opening faces an outward facing surface of the inner skin alongside the passenger compartment.

The inflator may be arranged at least partially within the system housing. It may also be arranged on a side of the system housing opposite the side on which the opening is formed. The inflator may include a plurality of gas orifices, in which case, the airbag is inflated by directing inflating gas through the orifices into the airbag.

The system housing can include a base wall having an aperture in which the inflator is partially received and flanged walls extending from edges of the base wall and forming the opening. The sensor system may be arranged on a side of the system housing opposite the side on which the opening is formed. It may also be arranged proximate the inflator or alongside the inflator. It may also be arranged outside of and on the inflator.

A method for deploying a side airbag of a vehicle having an outer skin in accordance with the invention includes providing a system housing having an opening, mounting the system housing with the opening facing a portion of a passenger compartment of the vehicle, arranging an inflatable airbag in the system housing, arranging an inflator in connection with the system housing, electronically sensing a side impact by detecting motion of a mass situated in a sensor housing relative to the sensor housing and in response to acceleration, actuating the inflator in response to the detected side impact to expel the airbag through the opening in the system housing into the passenger compartment, and coupling the mass to the inflator such that the inflator is actuated always upon sensing of the side impact above a certain magnitude in a direction perpendicular to the outer skin of the vehicle.

Optionally, the system housing is arranged between the outer skin and an inner skin of the vehicle such that the opening of the system housing is on an inward facing side of the system housing, the system housing being mounted such that the opening faces an outward facing surface of the inner skin alongside the passenger compartment. When the outer and inner skins form a door, the system housing may be arranged in the door.

Another embodiment of a vehicle in accordance with the invention includes a longitudinally extending outer skin arranged on a side of the vehicle, a system housing arranged inward of the outer skin and having an opening facing a portion of a passenger compartment of the vehicle, an inflatable airbag arranged in the system housing, an inflator arranged in connection with the system housing, and an electronic sensor system for detecting an impact into a side of the vehicle and comprising a sensor housing and a mass arranged in the sensor housing and movable relative to the sensor housing in response to acceleration. Movement of the mass relative to the sensor housing provides an indication of a side impact for which deployment of the airbag is desired. The inflator is actuated in response to a detected side impact by the sensor system in order to expel the airbag through the opening into the passenger compartment. Moreover, the inflator is actuated directly by the sensor system whenever the sensor system provides an indication of the side impact in a direction perpendicular to the outer skin of the vehicle for which deployment of the airbag is desired.

In another embodiment of a vehicle in accordance with the invention, the side impact airbag system comprises an airbag and inflator assembly including an airbag housing, at least one inflatable airbag arranged in the airbag housing such that when inflating, each airbag is expelled from the airbag housing into a passenger compartment of the vehicle, and a squib arranged to initiate inflation of the airbag(s). An electronic sensor system controls inflation of the airbag(s) upon a determination of a crash into the left or right side of the vehicle requiring inflation thereof and includes a sensor having a sensor housing arranged in a door or between inner and outer side panels along a left or right side of the vehicle and a movable sensing mass arranged within and movable in a lateral direction relative to the sensor housing in response to lateral accelerations of the sensor housing, and at least one electronic component responsive to the motion of the mass and arranged in a circuit with the squib for causing ignition of the squib. The sensor housing is arranged in such a position and a direction in the door or between the inner and outer panels along the left or right side of the vehicle as to cause movement of the mass upon an impact into the left or right side of the vehicle resulting in lateral acceleration of the sensor housing.

The electronic component may be a micro-processor containing an algorithm arranged to generate a time-varying signal representative of movement of the mass in the lateral direction, analyze the signal representative of the movement of the mass and generate a deployment signal based thereon.

The sensor housing may be mounted onto a side door of the vehicle or onto a side of the vehicle between centers of front and rear wheels of the vehicle.

BRIEF DESCRIPTION OF THE DRAWINGS

The invention will be described with reference to the following non-limiting drawings in which.

DETAILED DESCRIPTION OF THE PREFERRED EMBODIMENTS

Figure 1:
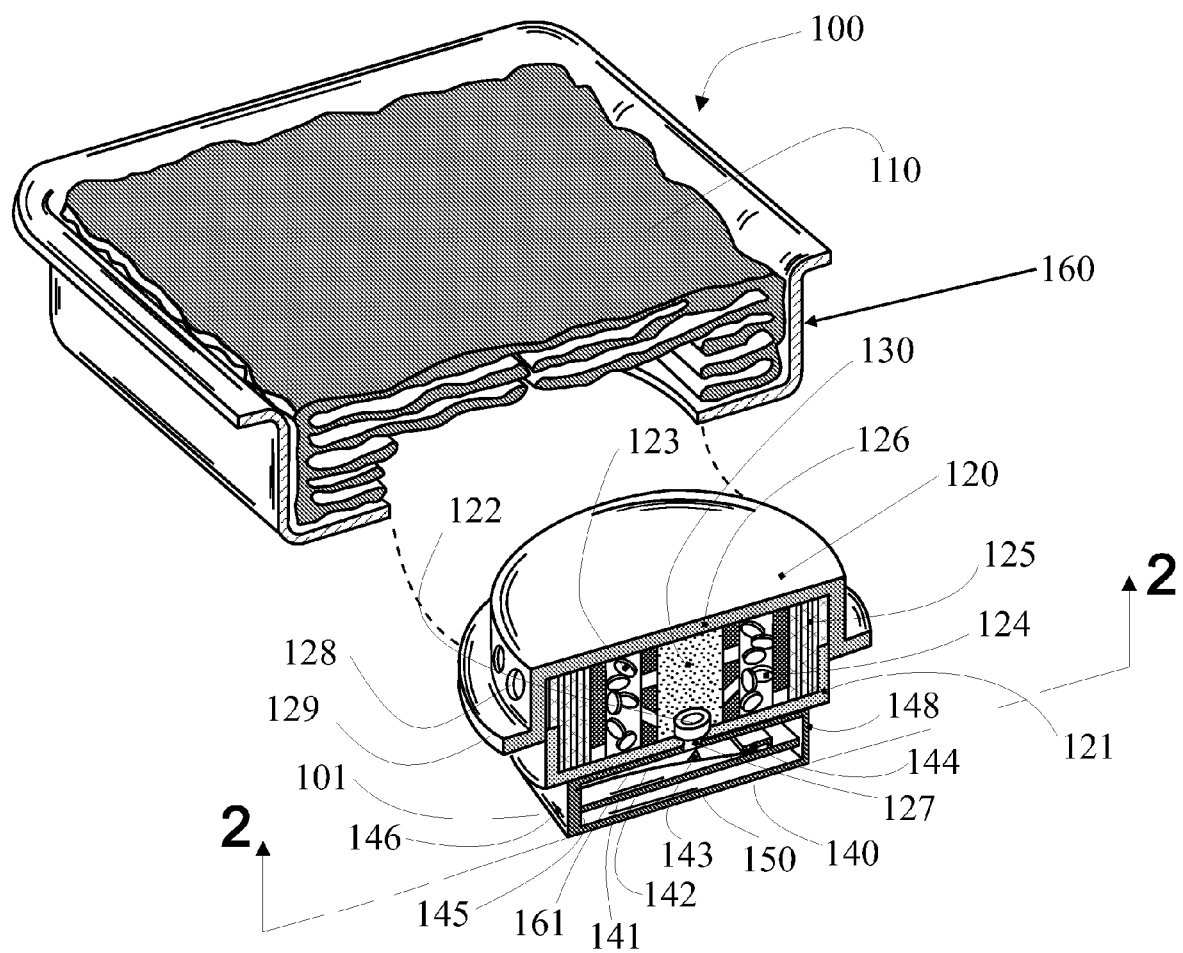
FIG. 1 is a perspective view with certain parts removed of an all mechanical self contained airbag system for mounting on the side of a vehicle to protect occupants in side impacts.
Figure 2:
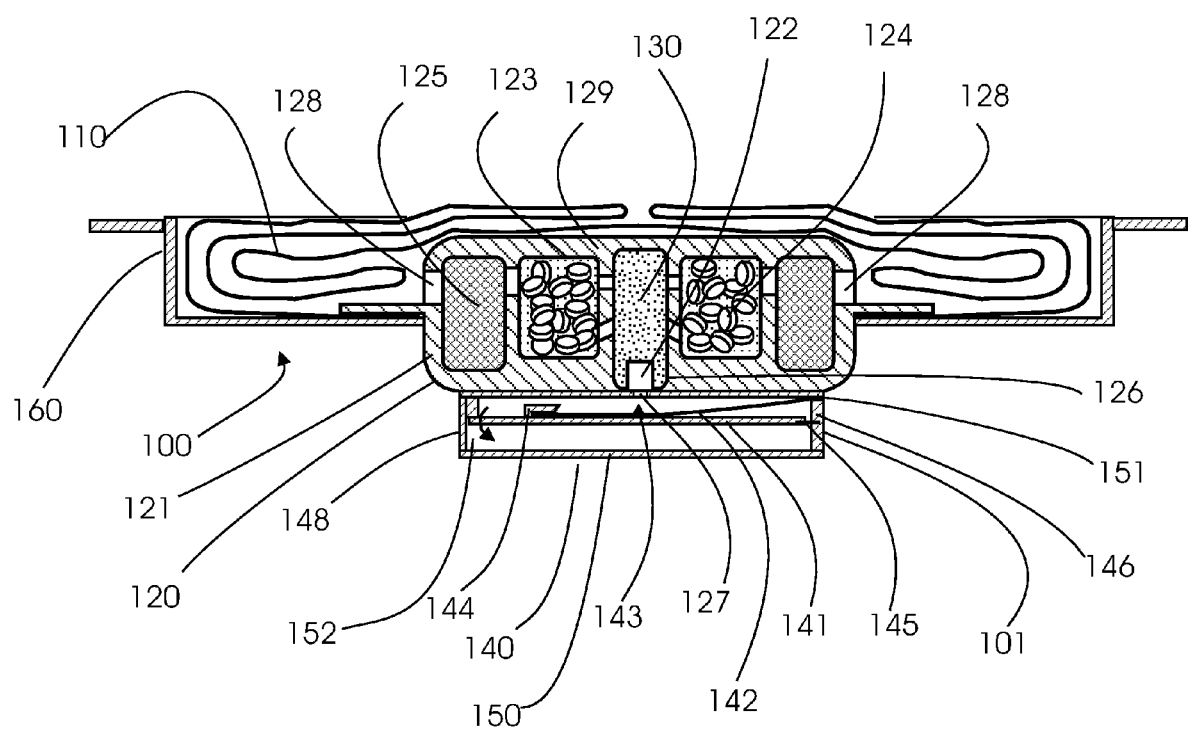
FIG. 2 is a cross sectional view of the apparatus of FIG. 1 taken along line 2-2.

Referring to the accompanying drawings wherein like reference numerals refer to the same or similar elements, FIGS. 1 and 2 show an all-mechanical self-contained airbag system for mounting on the side of a vehicle to protect occupants in side impacts in accordance with the invention which is designated generally as 100. The airbag system 100 contains one or more inflatable airbags 110, an inflator assembly 120, a mounting plate 160 for mounting the airbag system 100 on the side of the vehicle and a sensor assembly 140 mounted to the inflator assembly 120. The sensor assembly 140 contains a rotatable, substantially planar sensing mass 141 and a cantilevered biasing spring 142 which performs the dual purposes of biasing the sensing mass 141 toward its at rest position shown in FIG. 2 and also providing the energy to the firing pin 143 required to initiate a stab primer 122 as further described below. The sensing mass 141 contains a firing pin spring-retaining portion 144 that restrains the firing pin 143 during the sensing time and releases it when the sensing mass 141 has rotated through the sensing angle. The retaining portion 144 is an L-shaped descending part formed on a planar surface of the sensing mass 141 and defines a cavity for retaining an end of the spring 142.

As shown in FIG. 1, the mounting plate 160 constitutes a housing for the airbag system 100, i.e., it has a side wall and flanged peripheral walls extending from edges of the side wall which define an interior space in which the airbag(s) 110 and a portion of the inflator assembly 120 are arranged. The side wall is substantially flat and has a substantially circular aperture. The inflator assembly 120 is positioned in the aperture so that a portion thereof extends on either side of the side wall (See FIG. 2). Also as shown in FIG. 2, the housing of the inflator assembly 120 includes a flange that abuts against the side wall of mounting plate 160 around the aperture. As will be appreciated by those skilled in the art, the flanged peripheral walls of the mounting plate 160 are positioned around a panel on the side of the vehicle, e.g., a blow-out panel in the side door, so that the airbag(s) 110 when inflating will be expelled from the interior space defined by the mounting plate 160 into the passenger compartment of the vehicle. The mounting plate 160 may thus be mounted to a frame of the side door by attaching the flanged peripheral walls to the frame or attaching another portion of the mounting plate to the frame. The actual manner in which the mounting plate 160 is mounted in the side door, or on the side of the vehicle, is not critical so long as the mounting plate 160 is positioned to allow the airbag(s) 110 to be expelled from the interior space into the passenger compartment. Mounted as such, the sensor assembly 140 will be most proximate the exterior of the vehicle with the airbag 110 most proximate the passenger compartment of the vehicle.

The sensing mass 141 is connected to the housing 101 of sensor assembly 140 through a hinge 145 at one end whereby the opposed end is unrestrained so that the sensing mass 141 rotates about the hinge 145. In view of the mounting of the airbag system 100 on the side of the vehicle, hinge 145 defines a rotation axis which is perpendicular to the longitudinal direction of travel of the vehicle (x) as well as perpendicular to a direction (y) transverse to the longitudinal direction of travel of the vehicle, i.e., it is a vertical axis (z).

The sensor housing 101 includes opposed housing wall portions 146 and 148, an inner side cover 150 and an outer side cover 151 which is connected to, mounted on or the same part as a housing section 121 of the inflator assembly 120. The sensor housing 101 is filled with air and sealed (when appropriately mounted to the inflator assembly 120 whereby a small orifice 127 in outer side cover 151 is closed by the inflator assembly 120) so as to maintain a constant air density regardless of the ambient temperature or pressure. The sensor housing walls 146, 148 and sensing mass 141 are preferably molded along with the hinge 145 in a single insert molding operation to provide a careful control of the dimensions of the parts and particularly of a clearance 152 between the walls 146, 148 and the sensing mass 141 for the reasons described below.

The inflator assembly 120 comprises a stab primer 122, igniter mix 130 associated with the stab primer 122, one or more propellant chambers 123 containing propellant 124 and a series of cooling and filtering screens 125. In the particular design shown in FIGS. 1 and 2, the stab primer 122 has been placed inside of an igniter housing portion 126 of the housing of the inflator assembly 120, the housing of the inflator assembly being formed by opposed housing sections 121 and 129. Housing sections 121 and 129 cooperate to define a substantially cylindrical housing for the inflator assembly 120. Housing section 121 is coupled to the sensor housing 101. Exit orifices 128 are provided in the housing section 129 to allow the gas generated by the burning propellant 124 to flow into the airbag 110 to inflate the same. A small orifice 127 has been left open in the outer side cover 151 of the housing 101 of the sensor assembly 140, as well as the housing section 121, to allow the firing pin 143 to enter into the interior of the inflator assembly 120 and cause initiation of the stab primer 122. The stab primer 122 is from a family of the most sensitive stab primers requiring less than 25 in-oz of energy for activation. The standard M55 military detonator is a member of this class and has been manufactured in very large quantities during war time. For the purposes of this disclosure, the term primer will be used to represent both primers and detonators. The small orifice 127 will permit some gas to enter the sensor housing 101 during the time that the propellant 124 is burning and inflating the airbag 110 but since its area is less than 1% of the area of the exit orifices 128 through which the generated gas enters the airbag 110, less than 5% of the generated gas will pass into the sensor. Naturally, a larger orifice could be used but in all cases, the amount of gas which passes into the sensor housing 101 will be less than 10% of the total gas generated. Since this gas will be hot, however, it will destroy the sensor assembly 140 and leak into the door. In another implementation discussed below, a through bulkhead initiation system is used to prevent any gas from passing into the sensor assembly from the inflator assembly.

During operation of the device, sensing mass 141 rotates relative to sensor housing 101 in the direction of the arrow (shown in FIG. 2) under the influence of the acceleration with its motion being retarded by the biasing spring 142 and the gas pressure forces. Upon a sufficient rotation, biasing spring 142 is released from the retaining portion 144 of the sensing mass 141 and moves toward the inflator assembly 120 and the firing pin 143 formed in connection with the biasing spring 142 moves to impact stab primer 122 which burns and ignites the igniter mix 130. The igniter mix, which is typically composed of boron and potassium nitrate, then ignites the propellant 124 that burns and generates gas. The gas then flows through exit orifices 128 into the inflatable bag 110, inflating the bag.

In the embodiment shown in FIGS. 1 and 2, the stab primer 122 has been located in the center of the inflator housing. This is the conventional location for electrical primers in most driver's side inflator designs. The sensor is placed adjacent and in line with the inflator permitting the use of conventional inflator designs which minimize the size, complexity and weight of the inflator. The sensing mass 141 is approximately of square shape and the sensor housing 101 is made circular to mate with the inflator design.

In the particular design shown in FIGS. 1 and 2, a burning propellant inflator design was illustrated. Naturally, other propellant technologies such as a stored gas or hybrid (a combination of stored gas and propellant) could have been used without departing from the teachings of this invention.

It will be appreciated by those skilled in the art that since the airbag system 100 is designed to activate in side impacts, the sensing mass 141 is arranged for movement in a direction perpendicular to the sides of the vehicle, i.e., perpendicular to the longitudinal direction of travel of the vehicle, or in a pivoting movement about a vertical pivot axis. In this manner, the acceleration of the sensor housing 101 inward into the passenger compartment (that is, acceleration in a lateral direction or lateral acceleration since the passenger compartment is inward from the sensor housing relative to the side of the vehicle in the illustrated embodiment) resulting from a crash into the side of the vehicle, will cause the sensing mass 141 to move or pivot outward toward the impacting object thereby releasing its hold on the biasing spring 142.

Figure 3:
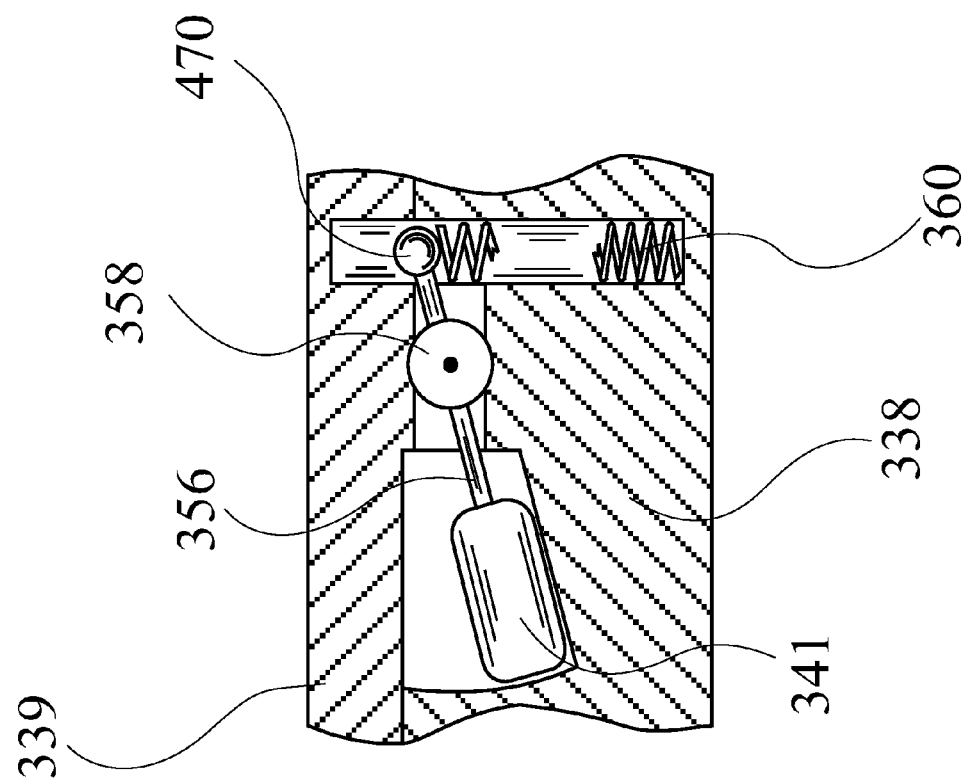
FIG. 3 is an enlarged fragmentary view of the sensing mass and attached lever arm extending from the D-shaft prior to rotation of the sensing mass incident to a crash as adapted to the all mechanical system of U.S. Pat. No. 4,580,810.
Figure 4:
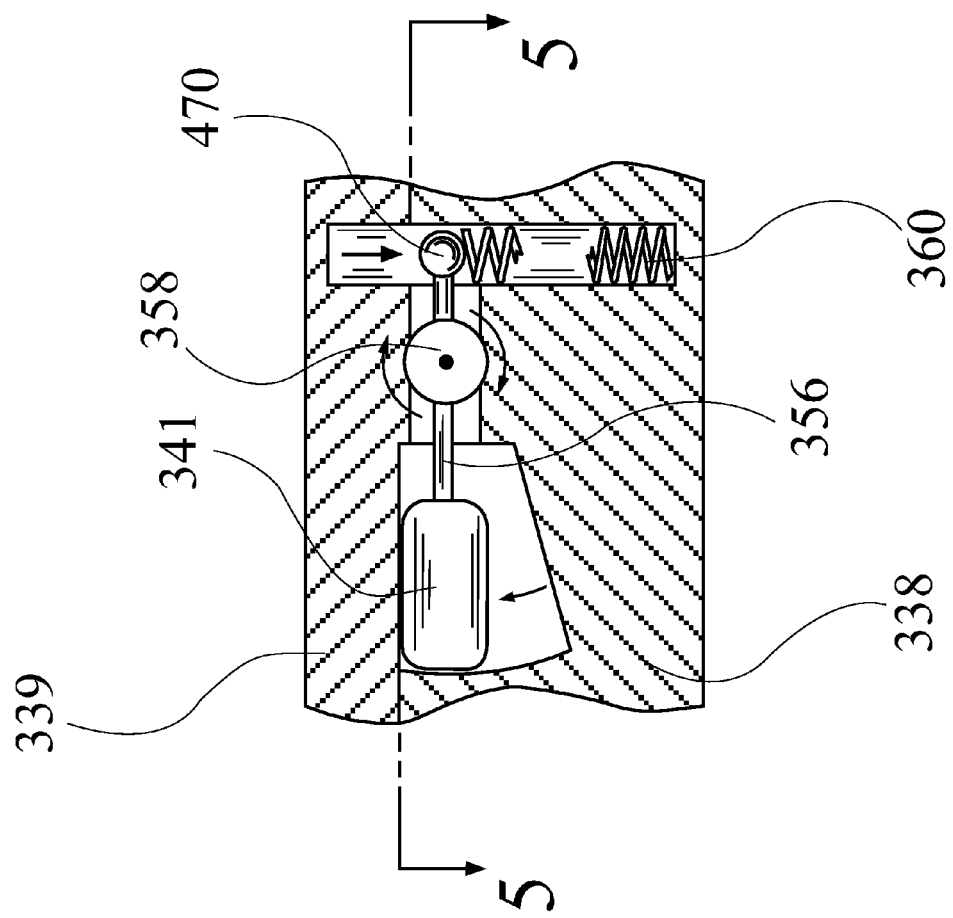
FIG. 4 is a similar view as FIG. 3 showing the sensing mass rotated as a result of a crash.
Figure 5:
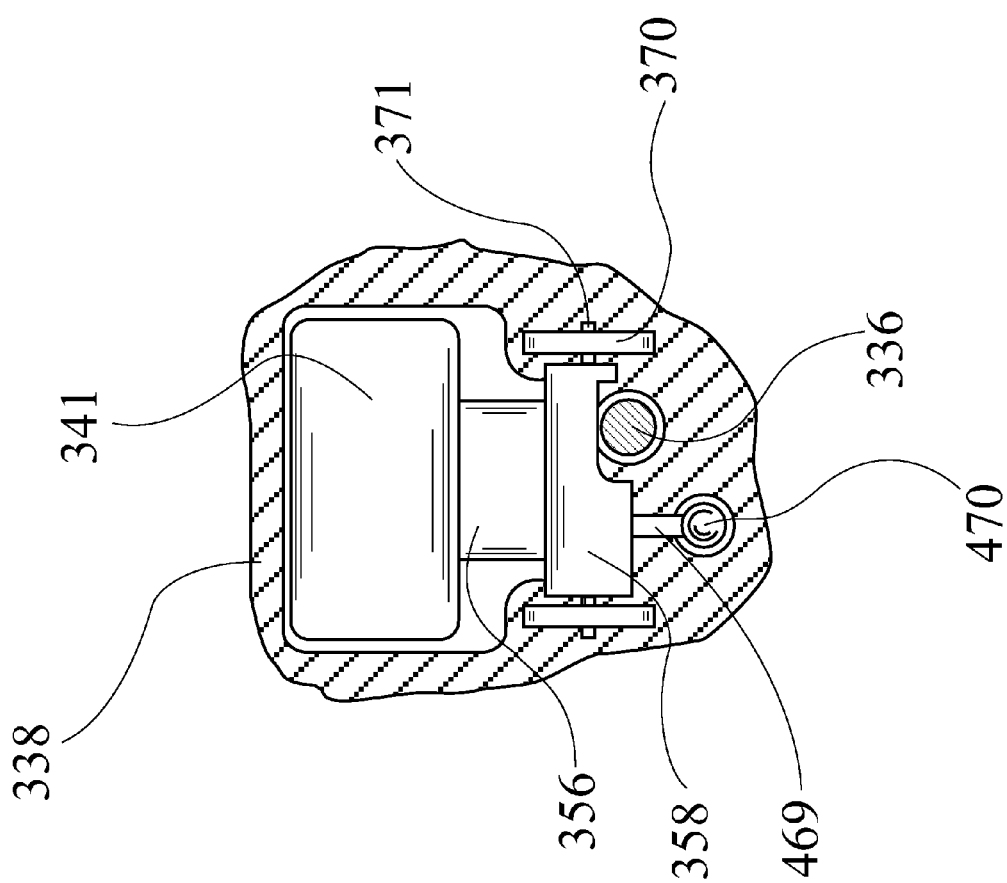
FIG. 5 is a view of the apparatus shown in FIG. 4 taken along line 5-5 and rotated 90 degrees to the right.
Figure 7:
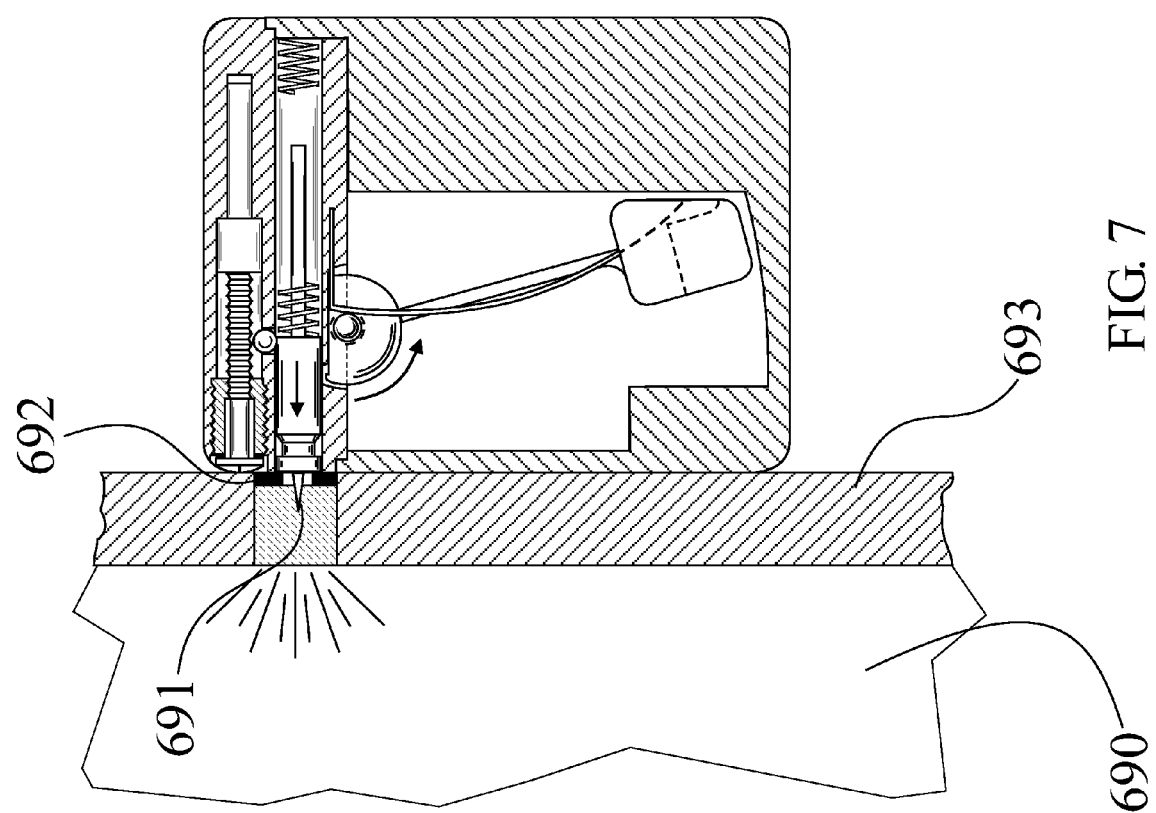
FIG. 7 is a cross section view of the sensor of FIG. 6 shown mounted on an inflator, shown in a fragmentary view, after it has triggered in response to a vehicle crash.
Figure 8:
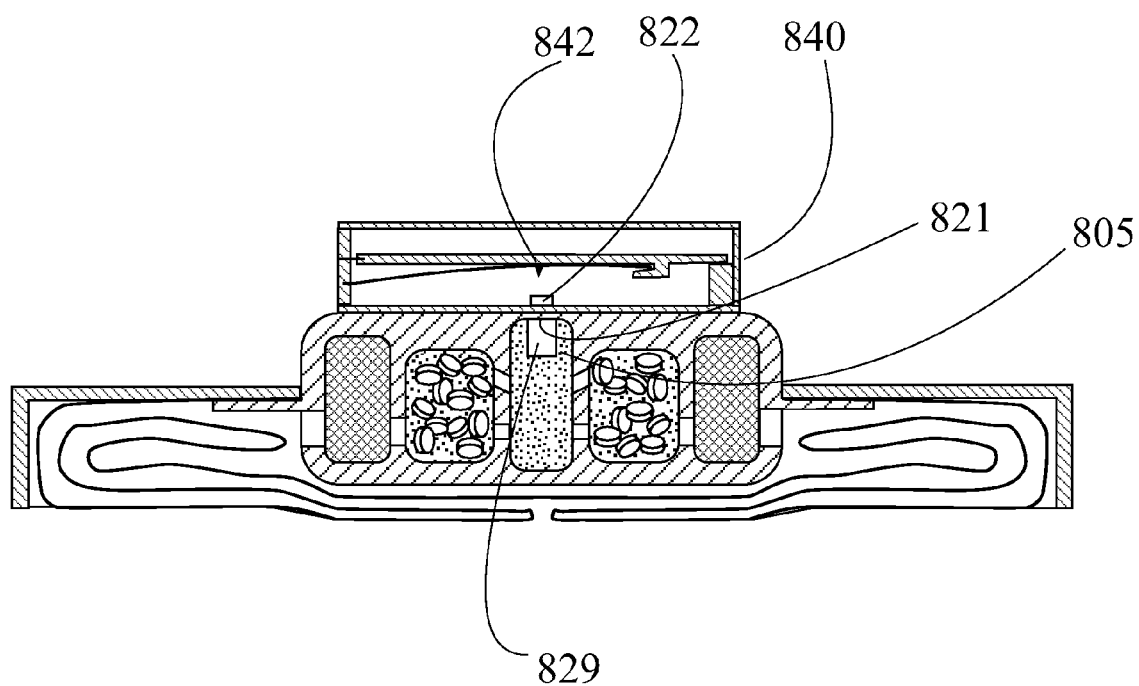
FIG. 8 is a cross section view of a through bulkhead initiation system adapted to a mechanical self contained airbag system.
Figure 9:
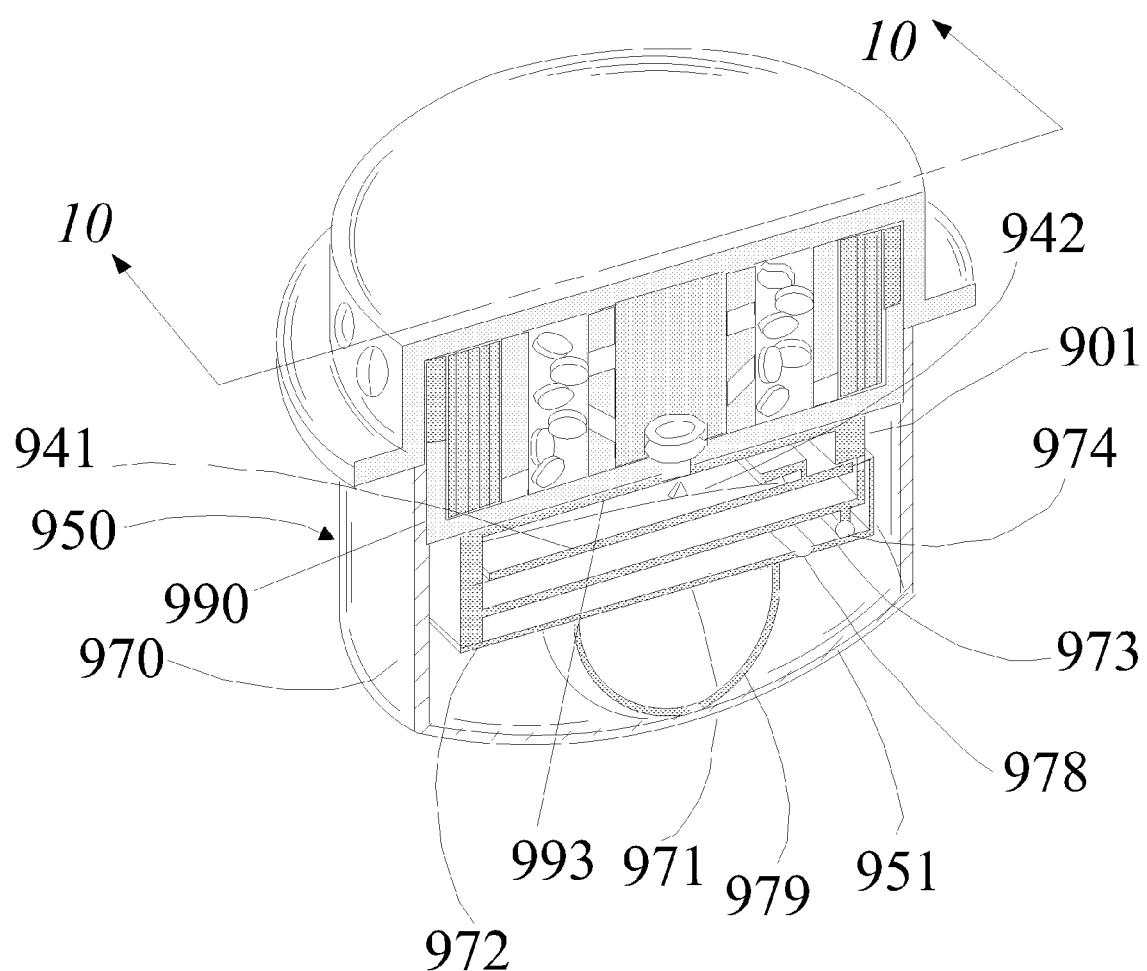
FIG. 9 is a perspective view of a mechanical self contained airbag system using a crush sensing arming system, shown in the state before a crash occurs.

FIG. 3 shows a fragmentary view of a sensing mass 341 and an attached lever arm 356 extending from a D-shaft 358 prior to rotation of the sensing mass incident to a crash as adapted to the all-mechanical system of Thuen, U.S. Pat. No. 4,580,810. This figure corresponds to FIG. 6 of the Thuen patent and shows the improved sensing mass design. FIG. 4 shows the same view as FIG. 3 with the sensing mass rotated, against the force from spring 360 acting on ball 470, into the actuating position where it has released the firing pin to initiate deployment of the airbag. FIG. 4 corresponds to FIG. 7 in the '810 patent. FIG. 5 is a view taken along line 5-5 of FIG. 4 and shows the shape of the sensing mass 341. Sensing mass 341 is retained in sensor housing 338, by cover 339, and rotates with D-shaft 358. This rotation is facilitated by pivots 371, which form part of the D-shaft, and pivot plates 370. In this manner, the sensing mass 341 is hinged to the sensor housing 338 permitting only rotational motion and rendering the sensor insensitive to the effects of cross-axis accelerations. In this embodiment, sensing mass 341, lever arm 356, ball 470, pin 469 and the D-shaft 358 are all made as one part that reduces the cost of the assembly. Naturally, they could be made as separate parts and assembled. When D-shaft 358 rotates through a sufficient angle, it releases firing pin 336 in the same manner as shown in FIGS. 8 and 9 of the '810 patent. The motion of the sensing mass 341 is undamped since the clearance between the sensing mass 341 and sensor housing 338 is sufficiently large so as to minimize the flow resistance of the air as the mass rotates. Naturally, in another implementation, the mass could be redesigned to have its motion damped by the flow of a gas in the manner shown in FIGS. 1 and 2 above. Also, two sensor systems of the type disclosed in FIGS. 3-5 can be used in the all-mechanical system in a similar way as shown in the '810 patent.

Figure 6:
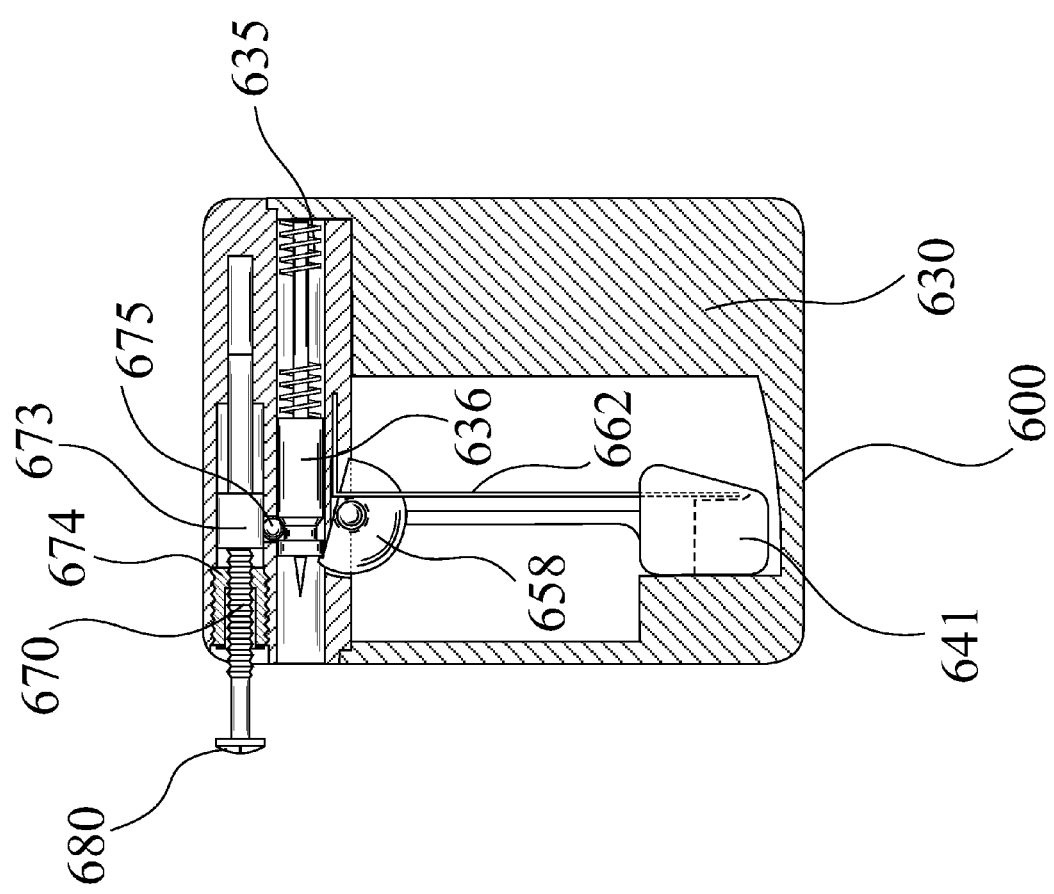
FIG. 6 is a cross section view of a sensor for use in an all mechanical system where the sensor is mounted outside of the inflator housing, shown in an unarmed or safe position prior to assembly with an inflator.

The all-mechanical system as depicted in FIGS. 3-5 requires that a special inflator be designed to accommodate the sensor within its housing. There has already been a substantial investment in tooling and production facilities for electrically actuated inflators by several inflator manufacturers. Also, substantial reliability statistics have been accumulated on these inflator designs through the hundreds of millions of miles that airbag equipped vehicles have traveled. It is desirable to build on this base with new systems that can be done using the sensor designs of this invention as depicted in FIGS. 6 and 7. This sensor design is adapted to be attached to a standard electrical inflator design where a stab primer 691 is used in place of the electrically actuated squib normally used.

The sensor-initiator is shown generally as 600 in FIG. 6. In a similar manner as described above, sensing mass 641 rotates in sensor housing 630 during a crash against the force provided by a cantilevered biasing spring 662 until a D-shaft 658 has rotated sufficiently to release a firing pin 636. Once released, firing pin 636 is propelled by firing pin spring 635 and impacts primer 691 to initiate deployment of the airbag. A washer 692 having an orifice is arranged between the primer 691 and the sensor housing 630 to minimize the leakage of inflator gases from the inflator 690 while the propellant is burning (FIG. 7). In this manner, the sensor does not have to be constructed of strong materials as discussed in the above referenced patent.

In one configuration of a self-contained system, the sensor assembly and the airbag and inflator assembly are kept separate until mounted onto the vehicle. In this case, the sensor is mounted using an appropriate apparatus (not shown) to the steering wheel after the wheel is mounted to the vehicle. Then, the airbag module is assembled to the steering wheel. In this case, the sensor is armed after it has been installed onto the vehicle through the use of arming screw 670. The inflator is only brought into contact with the sensor after the sensor has been mounted onto the vehicle, thus minimizing the chance of an inadvertent actuation prior to installation. To arm the sensor, arming screw 670 is rotated after the sensor is mounted onto the steering wheel causing it to move downward in its housing 674. This removes the retaining cylinder 673 from blocking the motion of locking ball 675 that removes a lock on the firing pin. As long as ball 675 remains locking the firing pin 636, rotation of the mass 641 will not release the firing pin and the sensor is unarmed. Additional apparatus, not shown, can be used to prevent the assembly and disassembly of the sensor from the steering wheel unless the arming screw 670 is in the unarmed position. Also, interference between the head 680 of the arming screw 670 and the surface 693 of the inflator 690 prevents assembly of the inflator and airbag module to the steering wheel until the sensor has been armed. Thus, in this very simple manner, an inexpensive all-mechanical airbag system can be made using standard inflator designs with minor modifications.

In FIGS. 1 and 2, the stab primer was shown as part of the inflator assembly, i.e., contained within the housing of the inflator assembly defined by housing portions 121,129. On the other hand, in FIG. 8, a cross section view of a through bulkhead initiation system adapted to a mechanical self-contained airbag system is illustrated. In this case, the stab primer 822 is instead part of a sensor assembly 840, i.e., arranged in the sensor housing on the bottom cover thereof if present, and when the stab primer 822 is initiated by a firing pin 842 formed in conjunction with a cantilevered, biasing spring (as in the embodiment shown in FIGS. 1 and 2), it creates a shock on one side of an inflator housing wall 821 which is transmitted through the wall 821 and interacts with a shock sensitive pyrotechnic mix 829 which has been placed into a cavity 805 in the igniter mix. Inflator housing wall 821 is alongside the bottom cover of the sensor housing, but in the alternative, the inflator housing wall may be the same as the bottom cover of the sensor housing. This through-bulkhead initiation system and the particular pyrotechnic mix formulation is well known to ordinance engineers where it has been applied to military devices. Such a system has not been used, however, in airbag systems. In this manner, a hole is not opened between the sensor assembly and the inflator assembly and the gas is prevented from leaking into the sensor assembly.

Figure 9A:
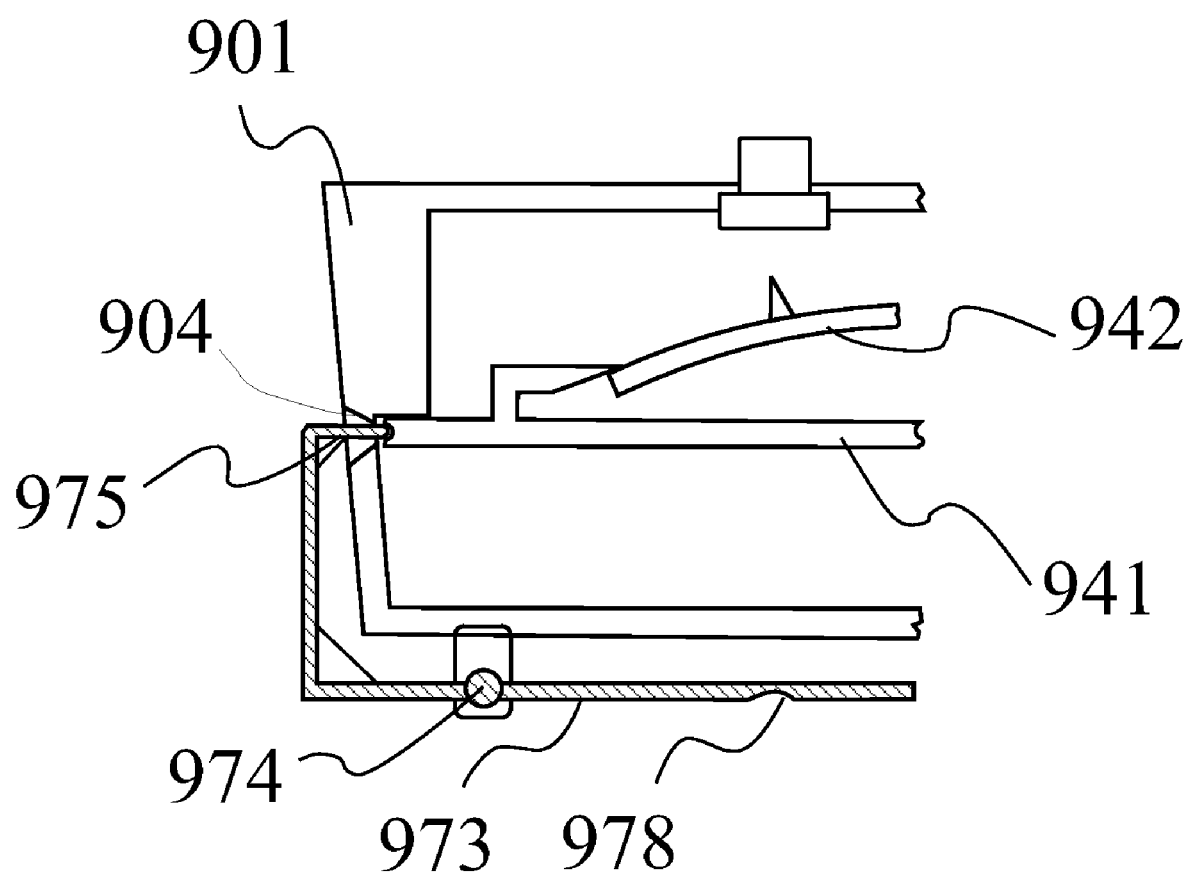
FIG. 9A is a blowup with certain parts removed showing a portion of the sensor shown in FIG. 9 in the unarmed position.

In FIG. 9, a perspective view of a mechanical self-contained airbag system using a crush sensing arming system designated generally as 950 is shown in the state before a crash occurs. In this embodiment, the sensor is armed when the vehicle door skin, or side skin, is crushed to where it impacts a curved impact plate, not shown, which then impacts a sensor can 970 surrounding the sensor assembly and displaces an outer cover 951 thereof relative to a sensor housing 901. Sensor can 970 has a tubular wall arranged partially alongside a housing section of the inflator assembly to thereby define a closed space between the outer cover 951 and an outer surface of the inflator assembly in which the sensor assembly is positioned. The sensor crush-sensing outer cover 951 has a slight arcuate shape so that it oil-cans or deflects downward pressing on lever 971 through a hemi-spherical pusher member 979. Lever 971 is hingedly mounted at one end thereof to enable it to rotate about its attachment point 972 to the sensor housing 901 and causes lever 973 to also rotate about its pivot point 974 on the sensor housing 901 by virtue of hinge 978. As shown in FIG. 9A, an end 975 of lever 973 extends through an aperture 904 in a wall of the sensor housing 901 and serves to restrain the sensing mass 941 from any movement. The rotation of lever 973 causes the end 975 of lever 973 to pull out of the sensor housing 901 where it was detenting the sensing mass 941 and preventing the sensing mass 941 from rotating to the degree necessary to release a firing pin spring 942. The sensing mass 941 is then free to move and release the firing pin spring 942 causing the firing pin spring 942 to ignite the stab primer in the inflator assembly, either by contact therewith or by pressure against the inflator assembly housing (see above) causing inflation of the airbag (FIG. 11A). Thus, until the sensor experiences a crushing force from the crash, the airbag system cannot deploy. The sensing mass 941, firing pin spring 942, inflator assembly and airbag may have the same structure as described above with reference to FIGS. 1 and 2. Other features of any of the disclosed embodiments not inconsistent with the embodiments shown in FIGS. 9-11A may also be incorporated therein.

Levers 971 and 973 are joined together by hinge 978 and can be made from a single piece of material. In this case, the hinge would be formed either by a coining or stamping operation or by a milling operation. Naturally, the two levers need not be joined together.

This provides a sensor system that requires the occurrence of two environments that are always present in a crash, crush and velocity change. The crush sensing outer cover 951 is designed to respond and arm the sensor when impacted from any reasonable direction by an impact plate, e.g., the curved impact plate discussed above, which is likely to occur in a crash. For many vehicles, the crush may not reach the sensor at the time that deployment is required. In the case where two systems are used on each side of the vehicle, for example, and an impact occurs at the A-pillar, the rear seat system may not experience crush in time. The arming system shown in FIG. 9 could still be used where the arming would occur when the system is mounted onto the vehicle instead of when the crash occurs. In this case, the curved impact plate would not be necessary and the deflection of the sensor cover 951 would occur either during the mounting process or by a separate operation after the system is mounted.

Figure 10:
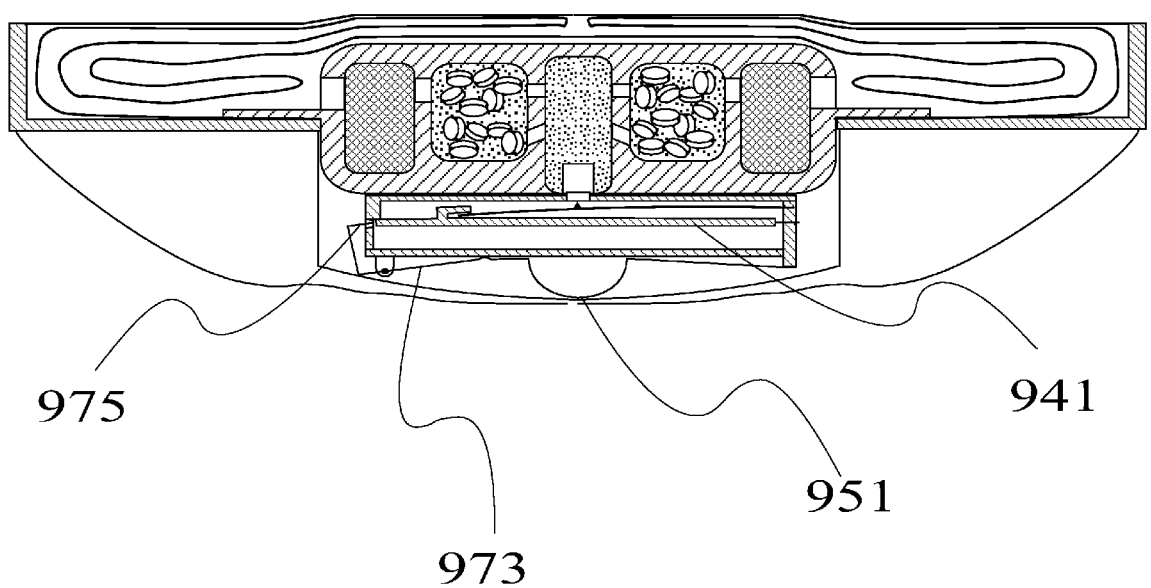
FIG. 10 is a cross section view of the apparatus of FIG. 9 taken along line 10-10 showing the crush sensing arming system after it has been activated by vehicle crush but before the sensing mass of the discriminating sensor has begun to move.
Figure 10A:
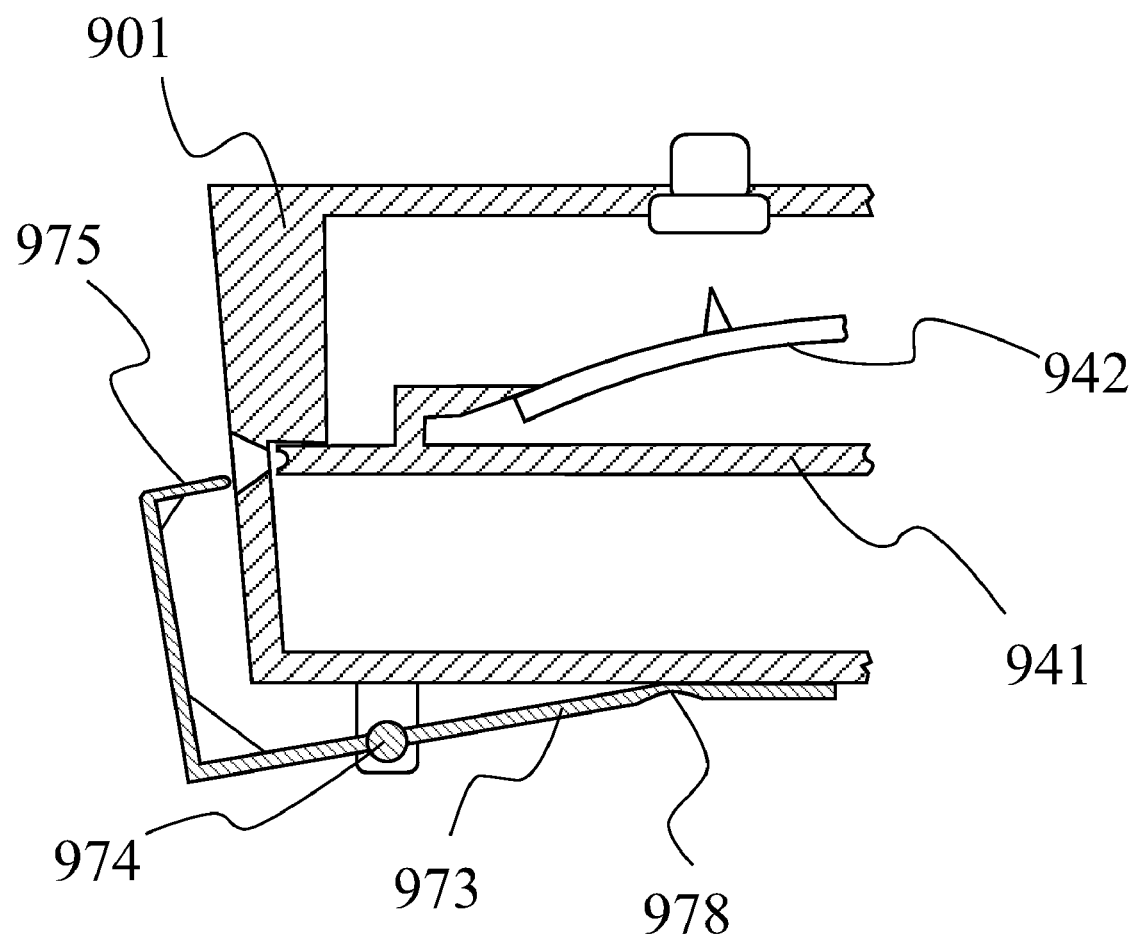
FIG. 10A is an enlarged view with certain parts removed showing a portion of the sensor shown in FIG. 10 in the armed position.
Figure 11:
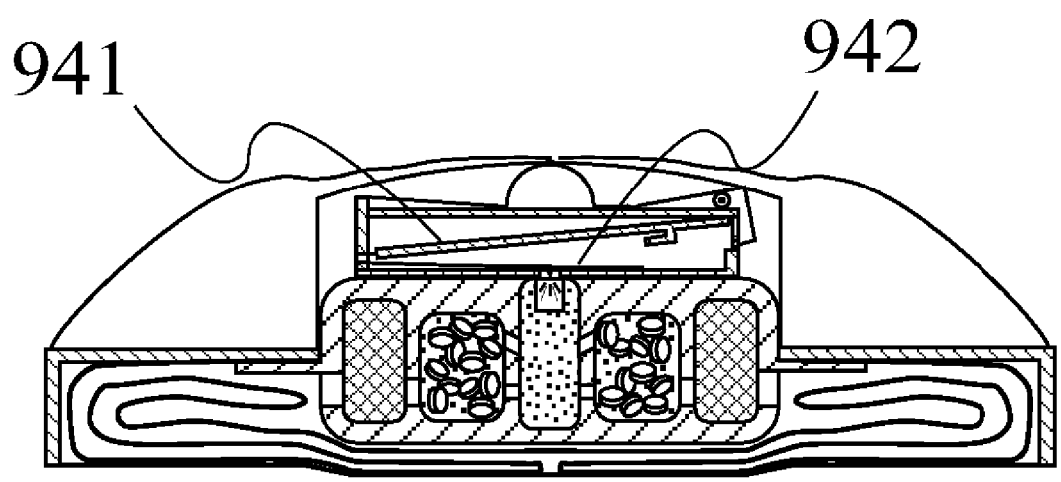
FIG. 11 is a cross section view of the apparatus of FIG. 9, also taken along line 10-10, showing the crush sensing arming system after it has been activated by vehicle crush and showing the sensing mass of the discriminating sensor after it has moved and released the firing pin, triggering the inflation of the airbag.
Figure 11A:
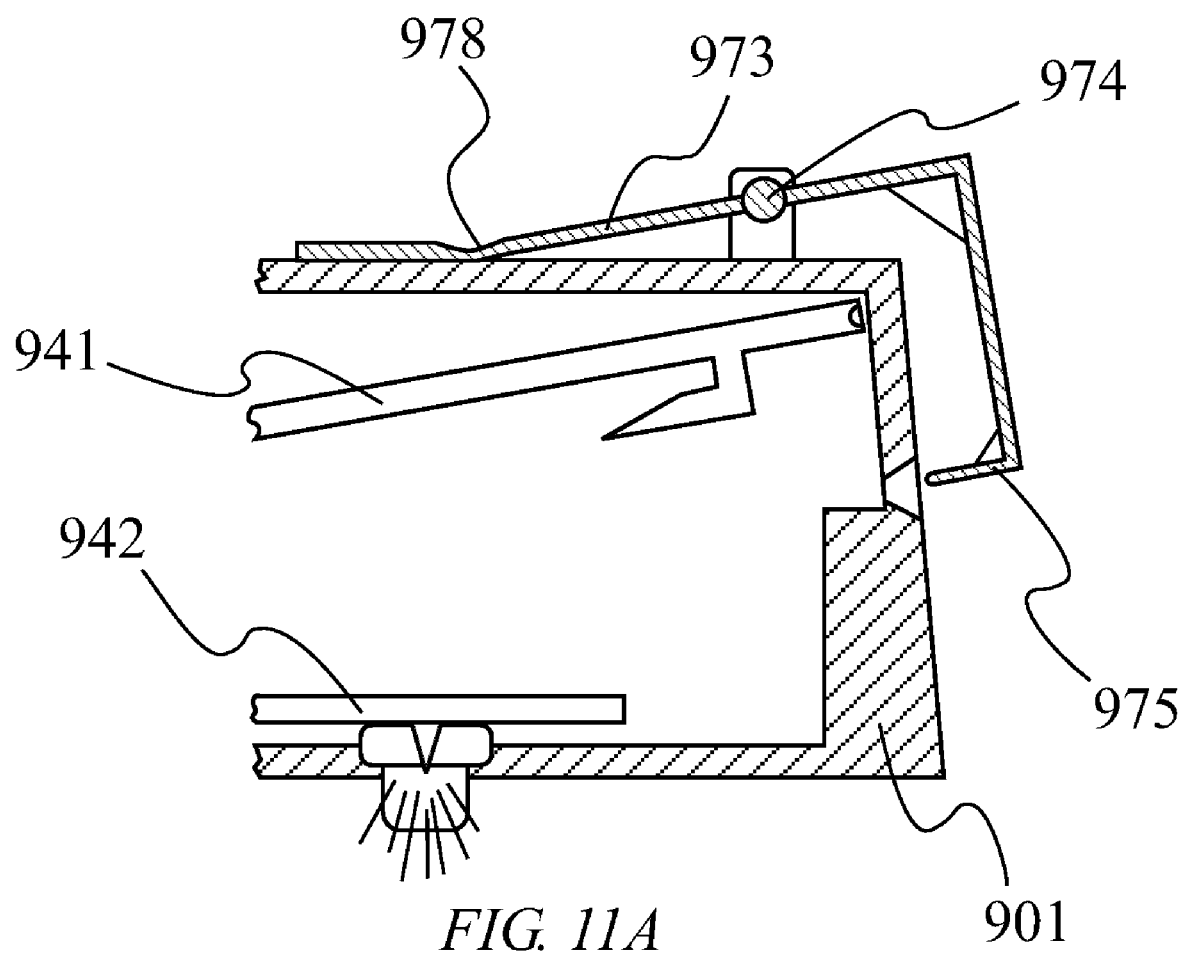
FIG. 11A is an enlarged view with certain parts removed showing a portion of the sensor shown in FIG. 11 in the fired position.

FIG. 10 is a cross section view of the apparatus of FIG. 9 taken along line 10-10 and FIG. 10A is an enlarged, partial view thereof showing the crush sensing outer cover 951 and lever system after end 975 has moved out of aperture 904 as a result of crush of the vehicle but before the sensing mass 941 of the discriminating sensor has begun to move. FIG. 11 is a similar view of the apparatus of FIG. 10 but shows the sensing mass 941 of the discriminating sensor after it has moved and released firing pin spring 942, triggering inflation of the airbag.

The motion of the sensing mass 941 is damped by the requirement that air must flow between the sensing mass and the housing in the manner described in more detail in the '253 patent referenced above. Naturally, other damping methods such as magnetic damping could also be used.

In the case of FIG. 9, the sensor is entirely surrounded by a metal can 970 that is formed by a drawing process. The sensor can 970 is attached to the inflator assembly; more particularly, the sensor can 970 is attached to one or more housing sections thereof. The attachment of the sensor can 970 to the inflator assembly or housing section(s) thereof is achieved using structural adhesive 990 such as a urethane or epoxy compound. In this manner, the sensor is hermetically sealed.

The term hermetic seal as used herein means a seal which will not permit the passage of any significant amount of moisture or other contaminants into the interior of the self-contained airbag module and further will not permit the passage of gas into or out of the sensor housing of sufficient quantity as to change the gas density by more than about 5% at any time over the life of the vehicle. Each vehicle manufacturer has an accelerated life test that can be used along with appropriate sensor testing equipment to test the sensor seals according to this definition. Typical O-ring seals are not hermetic by this definition; however properly designed plastic and metal welded seals and epoxy and urethane seals are hermetic.

Figure 12:
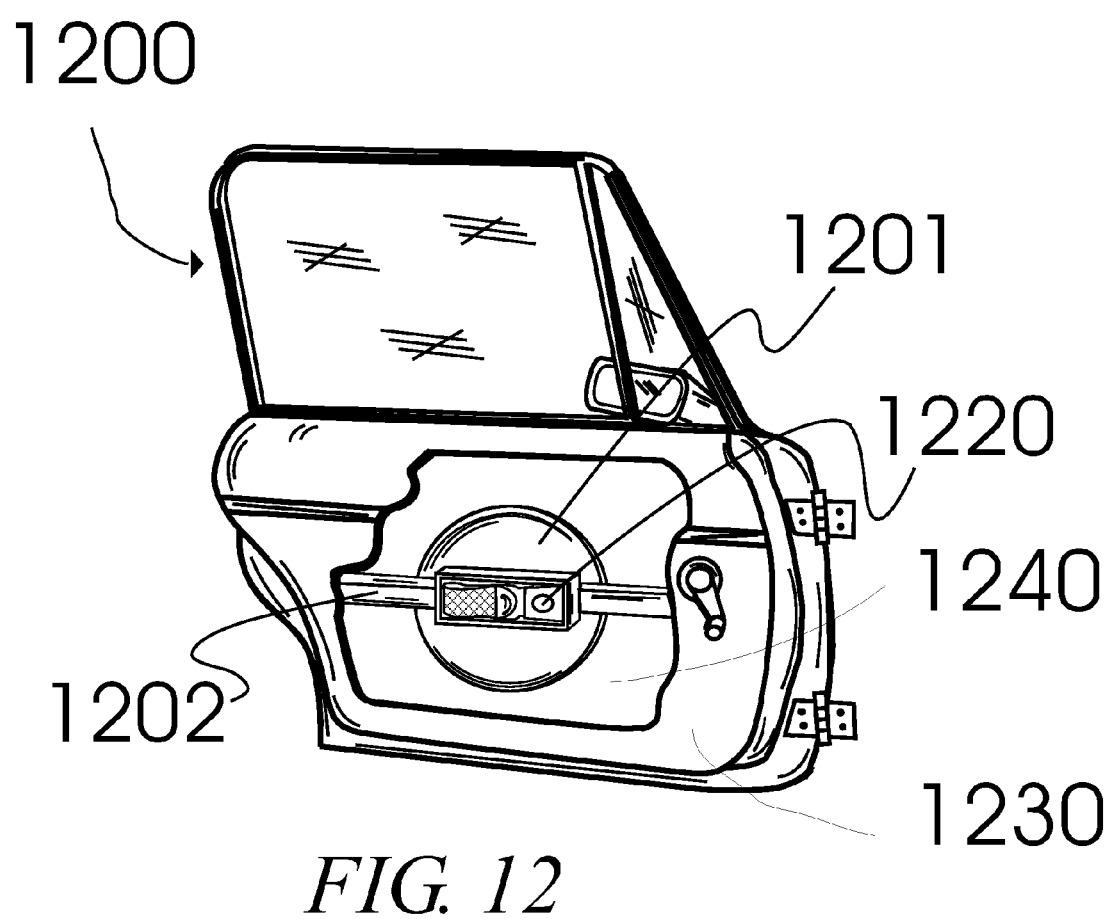
FIG. 12 is a perspective view of a side impact airbag system illustrating the placement of the airbag vents in the door panel and the exhausting of the inflator gases into the vehicle door and also showing the use of a pusher plate to adjust or account for the mismatch between the point of impact of an intruding vehicle and the sensor of a self contained side impact airbag system.

FIG. 12 is a perspective view of a side impact airbag system illustrating the placement of the airbag vents in the door panel and the exhausting of the inflator gases into the vehicle door 1200 and also showing the use of a pusher plate 1201 to account for the mismatch between the point of impact of an intruding vehicle (or other object) and the sensor of a self-contained side impact airbag system 1220. The pusher plate 1201 is shown attached to the main structural door beam 1202 in this illustration but other mounting systems are also possible. The airbag system 1220 is shown between the inner panel 1230 and the outer panel 1240 of the door 1200.

The pusher plate 1201 is dimensioned and installed in the door 1200 so that during a side impact to any portion of the side of the vehicle which is likely to cause intrusion into the passenger compartment and contact an occupant, the pusher plate will remain in a substantially undistorted form until it has impacted with the sensor causing the sensor to begin deployment of the airbag. In this implementation, a non-sodium azide propellant, such as nitro-cellulose, is used and the gas is exhausted into the door though a pair of orifices. The airbag system 1220 may be any of those disclosed herein.

As shown in FIG. 12, the pusher plate 1201 may be circular.

Figure 13:
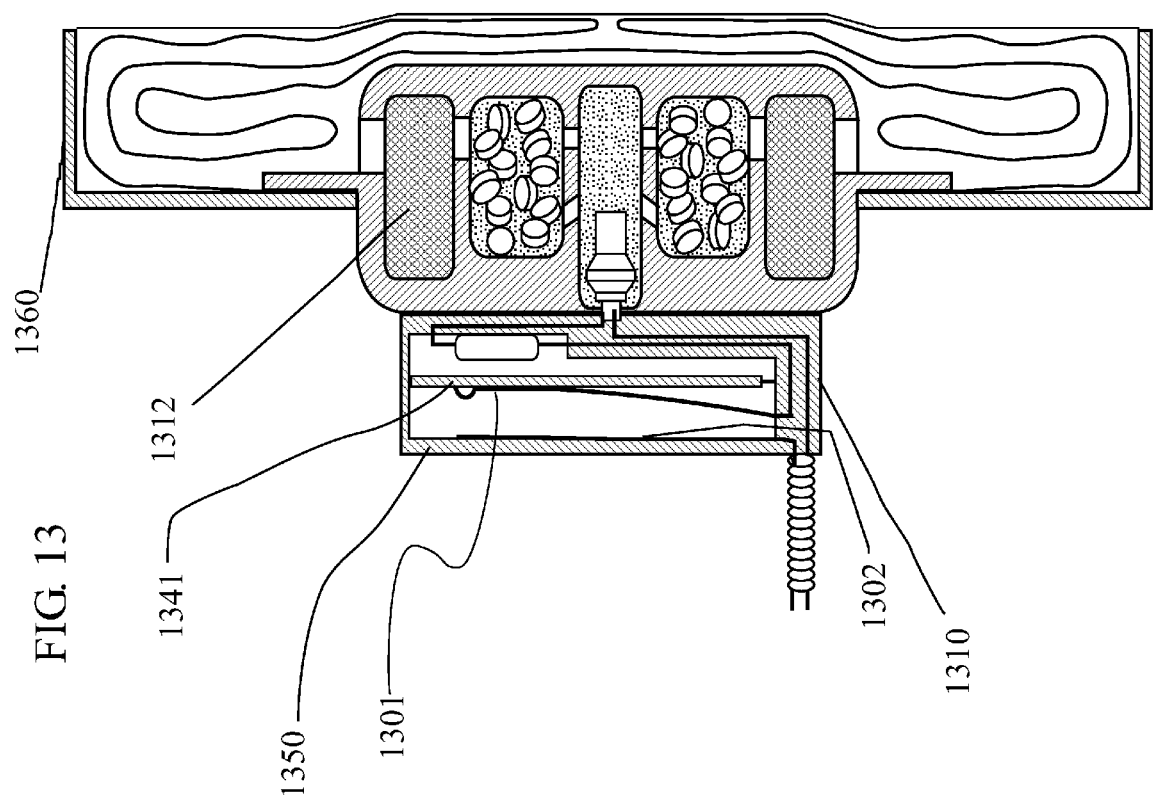
FIG. 13 is a cross section view of a self-contained side impact airbag system using an electro-mechanical sensor.

FIG. 13 is a cross-sectional view of a self-contained side impact airbag system using an electro-mechanical sensor. An electro-mechanical sensor is one in which the sensing is accomplished through the motion of a sensing mass from a first at-rest position to a second activating position at which point an event happens which typically involves the closing of a switch by mechanical or magnetic means. In the embodiment shown in FIG. 13, biasing spring contact 1301 is caused to engage contact 1302 arranged on an inside of the inner side cover 1350 when the sensor experiences a crash as described above, i.e., acceleration of the sensor housing 1310 above a predetermined threshold value which results in movement of the sensing mass 1341 until the biasing contact 1301 contacts the other contact 1302. Specifically, the biasing spring contact 1301 is positioned in a position (e.g., bearing against sensing mass 1341 in sensor housing 1310) so that it is moved during a crash along with movement of the sensing mass 1341 (to the left in FIG. 13) to thereby bring the biasing spring contact 1301 into contact with contact 1302. An electrical circuit is thereby completed causing ignition of the primer or squib and thereafter the igniter mix and propellant. As shown in FIG. 13, the structure of the sensor housing 1310, inflator assembly 1312, mounting plate 1360 and sensing mass 1341 may be as described above in appropriate part.

The implementation of FIG. 13 is a preferred location for the self-contained airbag module of this invention. Naturally, some of the teachings of this invention can be practiced without necessitating a self-contained module. For some implementations, for example, it is desirable to place the airbag module at some other location than the vehicle door. One such location, for example, is the vehicle seat. For this implementation, the crash sensor in general cannot be co-located with the airbag module. Therefore, it can be mounted on the side of the vehicle or elsewhere as long as there is a sufficiently strong member connecting the crash sensor to the vehicle side such that there is little or no plastic deformation between the sensor and the side of the vehicle. Thus, the sensor experiences essentially the same crash signal as experienced by the side of the vehicle. Through this technique, the sensor acts as if it were mounted on the side of the vehicle and yet the wiring does not have to go through the door and through the hinge pillar to the airbag module. In this way, the sensor can be mounted remote from the vehicle side and yet perform as if it were located on the vehicle side which is accomplished by using an extension of the sensor, which can be a structural member of the vehicle.

Figure 14:
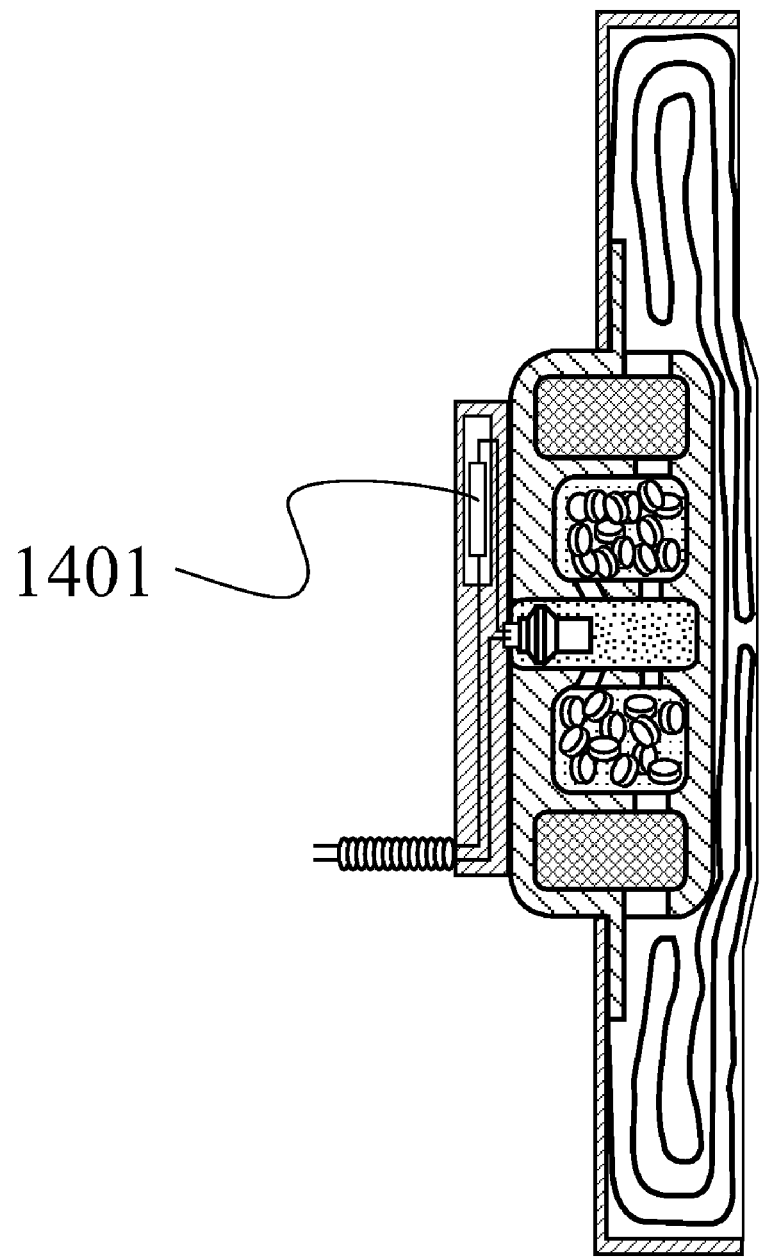
FIG. 14 is a cross section view of a self-contained side impact airbag system using an electronic sensor.

FIG. 14 is a cross-sectional view of a self-contained side impact airbag system using an electronic sensor that generates a signal representative of the movement of a sensing mass. Unless otherwise stated or inconsistent with the following description of an airbag system with an electronic sensor, the airbag system with an electronic sensor may include the features of the airbag system described above and below. An electronic sensor is one in which the motion of the sensing mass is typically continuously monitored with the signal electronically amplified with the output fed into an electronic circuit which is usually a micro-processor. Electronic sensors typically use accelerometers that usually make use of strain gauge or piezo-electric elements shown here as 1401. The piezo-electric element generates a signal representative of the movement of the sensing mass. Modern accelerometers are sometimes micro-machined silicon and combined with other elements on an electronic chip. In electro-mechanical sensors, the motion of the sensing mass is typically measured in millimeters and is much larger than the motion of the sensing mass in electronic sensors where the motion is frequently measured in microns or portions of a micron. The signal representative of the motion of the sensing mass is recorded over time and an algorithm in the micro-processor may be designed to determine whether the movement over time of the sensing mass results in a calculated value which is in excess of the threshold value based on the signal. The sensing mass may constitute part of the accelerometer, e.g., the sensing mass is a micro-machined acceleration sensing mass. In this case, the micro-processor determines whether the movement of the sensing mass over time results in an algorithmic determined value that is in excess of the threshold value based on the signal.

In embodiments using an electronic sensor, the inflator may include a primer, which is part of an electronic circuit including the accelerometer. In this case, if movement over time of the sensing mass results in a calculated value in excess of the threshold value, the electronic circuit is completed thereby causing ignition of the primer.

When the term electrical as used herein it is meant to include both electro-mechanical and electronic systems.

Figure 15:
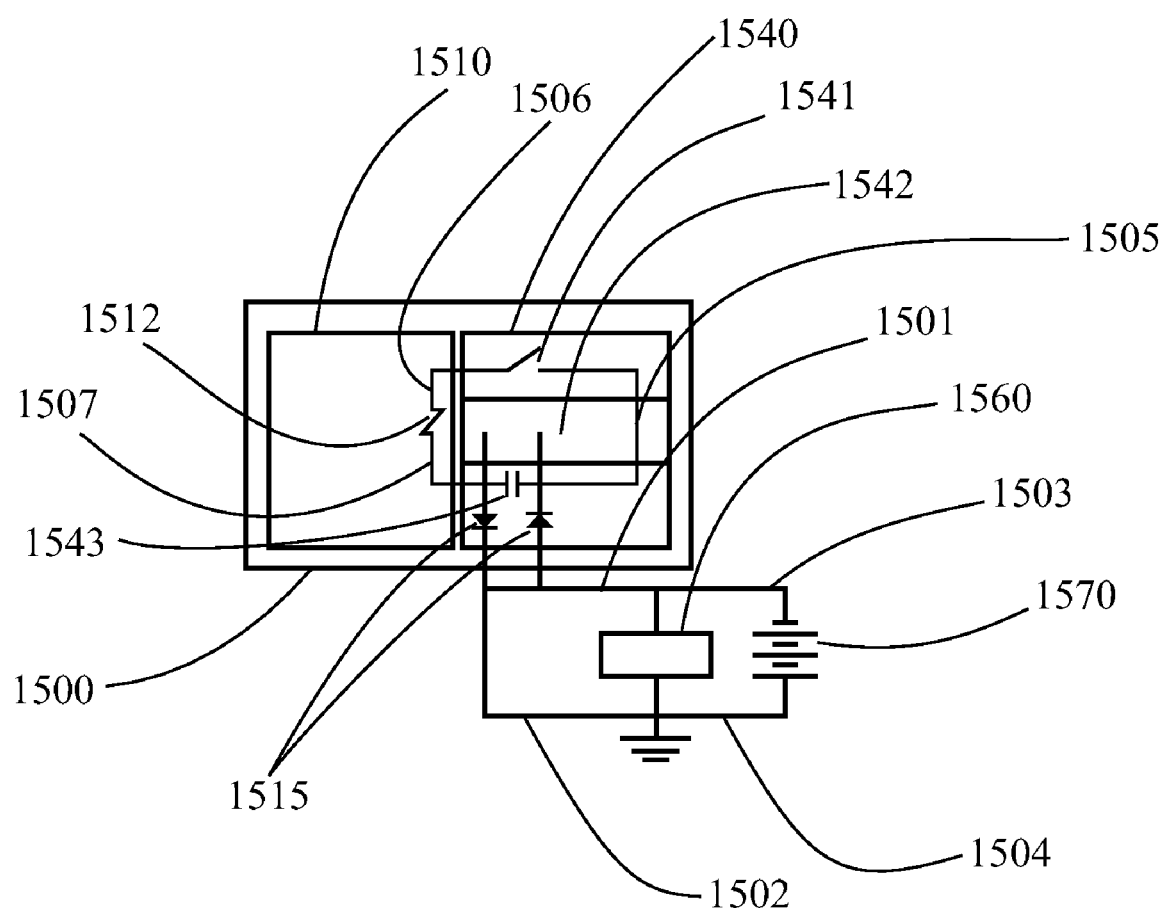
FIG. 15 is a schematic of the electric circuit of an electro-mechanical or electronic self contained side impact airbag system.

FIG. 15 is a schematic of the electric circuit of an electro-mechanical or electronic side impact airbag system. The self-contained module implementation shown generally at 1500 contains a sensor assembly 1540 and an airbag and inflator assembly 1510. The sensor assembly 1540 contains a sensor 1541, a diagnostic module 1542, an energy storage capacitor 1543, and a pair of diodes 1515 to prevent accidental discharge of the capacitor if a wire becomes shorted. The module is electrically connected to a diagnostic monitoring circuit 1560 by wire 1501 and to the vehicle battery 1570 by wire 1503. It is also connected to the vehicle ground by wire 1502. The sensor, diagnostic and capacitor power supplies are connected to the squib by wires 1505 through 1507.

In a basic configuration, the diagnostic monitoring circuit 1560 checks that there is sufficient voltage on the capacitor 1543 to initiate the inflator in the event of an accident, for example, and if any of wires 1501, 1502, 1503 or 1504 are severed. In this case, the diagnostic internal to the self-contained module would not be necessary. In more sophisticated cases, the diagnostic module 1542 could check that the squib resistance is within tolerance, that the sensor calibration is correct (through self testing) and that the arming sensor has not inadvertently closed. It could also be used to record that the arming sensor, discriminating sensor and airbag deployment all occurred in the proper sequence and record this and other information for future investigative purposes. In the event of a malfunction, the diagnostic unit could send a signal to the monitoring circuitry that may be no more than an indication that the capacitor was not at full charge.

A substantial improvement in the reliability of the system is achieved by placing the diagnostic module and backup power supply within the self contained airbag system particularly in the case of side impacts where the impact can take place at any location over a wide area. An impact into a narrow pole at the hinge pillar, for example, might be sufficient to sever the wire from the airbag module to the vehicle power source before the sensor has detected the accident.

Most of the advantages of placing the sensor, diagnostic and backup power supply within the self contained module can of course be obtained if one or more of these components are placed in a second module in close proximity to the self contained module. For the purposes of electro-mechanical or electronic self contained modules, therefore, as used herein, the terms "self contained module" or "self contained airbag system" will include those cases where one or more of the components including the sensor, diagnostic and backup power supply are separate from the airbag module but in close proximity to it. For example, in the case of steering wheel mounted systems, the sensor and backup power supply would be mounted on the steering wheel and in the case of side impact door mounted systems, they would be mounted within the door or seat. In conventional electrical or electronic systems, on the other hand, the sensor, diagnostic module and backup power supply are mounted remote from the airbag module in a convenient location typically centrally in the passenger compartment such as on the tunnel, under the seat or in the instrument panel.

With the placement of the backup power supply in the self contained module, greater wiring freedom is permitted. For example, in some cases for steering wheel mounted systems, the power can be obtained through the standard horn slip ring system eliminating the requirement of the ribbon coil now used on all conventional driver airbag systems. For side impact installations, the power to charge the backup power supply could come from any convenient source such as the power window or door lock circuits. The very low resistance and thus high quality circuits and connectors now used in airbag systems are not required since even an intermittent or high resistance power source would be sufficient to charge the capacitor and the existence of the charge is diagnosed as described above.

Herein, the terms capacitor, power supply and backup power supply have been used interchangeably. Also, other energy storage devices such as a rechargeable battery could be used instead of a capacitor. For the purposes of this disclosure and the appended claims, therefore, the word capacitor will be used to mean any device capable of storing electrical energy for the purposes of supplying energy to initiate an inflator. Initiation of an inflator will mean any process by which the filling of an airbag with gas is started. The inflator may be either pure pyrotechnic, stored gas or hybrid or any other device which provides gas to inflate an airbag.

Figure 16:
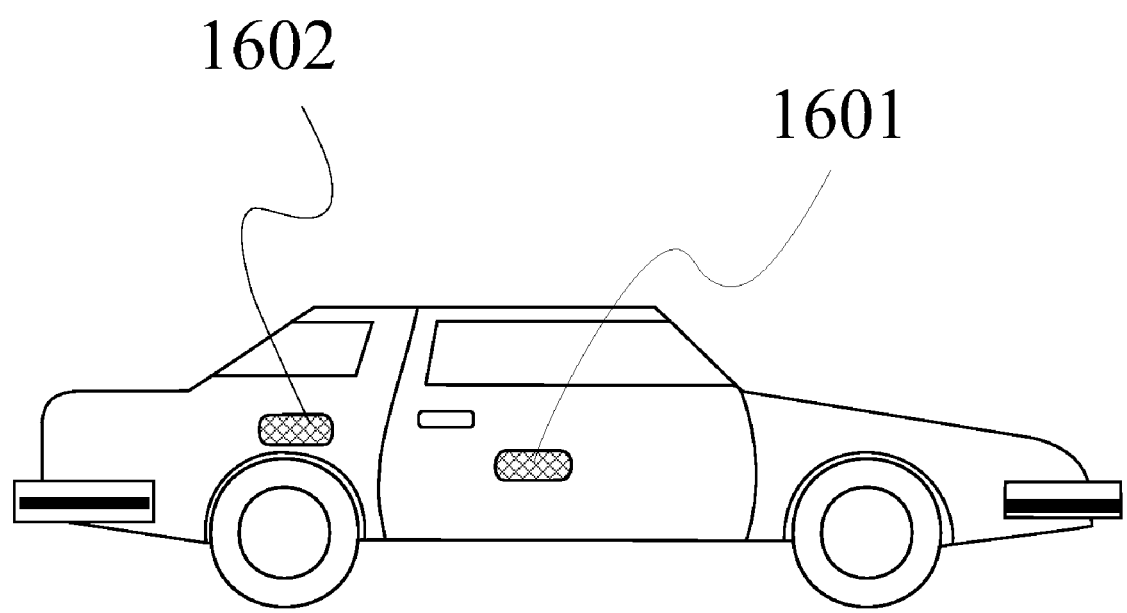
FIG. 16 is a side view of a vehicle showing the preferred mounting of two self contained airbag modules into the side of a coupe vehicle, one inside of the door for the driver and the other between the inner and outer side panels for the rear seat passenger.

FIG. 16 is a side view showing the preferred mounting of two self contained airbag modules 1601 and 1602 on the side on a two door vehicle. Module 1601 is mounted inside of a door, whereby the sensor housing 101 of module 1601 is most proximate the exterior of the vehicle, while module 1602 is mounted between the inner and outer side panels at a location other than the door, in this case, to protect a rear seated occupant. Each of the modules has its own sensor and, in the case of electrical self-contained systems, its own capacitor power supply and diagnostic circuit. Any of the airbag systems disclosed herein may be mounted either inside a door or between inner and outer side panels of the vehicle at a location other than the door and for non self-contained systems, the sensor can be mounted anywhere provided there is a sufficiently strong link to the vehicle side so that the sensor is accelerated at a magnitude similar to the vehicle side crush zone during the first few milliseconds of the crash. In view of the mounting of module 1602 between inner and outer panels of the vehicle at a location other than the door, the inner and outer panels are thus fixed relative to the vehicle frame and the module 1602 is also thus fixed relative to the frame. By contrast, the module 1601 mounted inside the door is moved whenever the door is opened or closed.

Thus, disclosed above is a vehicle including a side impact crash sensor, a transfer structure interposed between the side of the vehicle and the sensor, and an occupant restraint device such as a side impact airbag system. When an object strikes the side of the vehicle, the transfer structure transfers the lateral force from the side of the vehicle to the sensor. The side impact crash sensor detects the lateral force or acceleration applied to a side of the vehicle. The airbag system is connected to the sensor and arranged to deploy based on the force or acceleration detected by the sensor. The transfer structure may be a plate, and is optionally arranged to account for a mismatch between the point of impact of an object on the side of the vehicle and the sensor. The plate may be mounted on a main structural beam in the vehicle, such as the main structural beam of the door of the vehicle. The entire system may be mounted between the inner and outer panels of the door of the vehicle. In another embodiment, there is a mismatch adjustment or accounting structure in place of or in combination with the transfer structure.

The side impact crash sensor for a vehicle may include a housing, a mass within the housing movable relative to the housing in response to accelerations of the housing, means responsive to the motion of the mass upon acceleration of the housing in excess of a predetermined threshold value for controlling an occupant protection apparatus and means for mounting the housing in such a position and a direction as to sense an impact into a side of the vehicle. The sensor may be an electronic sensor arranged to generate a signal representative of the movement of the mass and optionally comprise a micro-processor and an algorithm for determining whether the movement over time of the mass as processed by the algorithm results in a calculated value which is in excess of the threshold value based on the signal. In the alternative, the mass may constitute part of an accelerometer, i.e., a micro-machined acceleration sensing mass. The accelerometer could include a piezo-electric element for generating a signal representative of the movement of the mass.

With respect to the arrangement of the sensor, some non-limiting mounting locations include: 1) inside a door of the vehicle, 2) between inner and outer panels not associated with a door of the vehicle, 3) in a seat in the vehicle and 4) at a location remote from the side of the vehicle in which case, the vehicle should include a sufficiently strong member connecting the sensor to the vehicle side such that there is little or no plastic deformation between the sensor and the side of the vehicle.

Another embodiment of the sensor comprises a sensor assembly responsive to a side impact for controlling the occupant protection apparatus, i.e., the airbag(s). The sensor assembly comprises a sensor housing, a mass arranged within the sensor housing and movable relative to the housing in response to acceleration thereof and means responsive to the movement of the mass upon acceleration of the housing in excess of a predetermined threshold value for controlling deployment of the airbag(s). The assembly may be mounted onto a side door of the vehicle and/or a side of the vehicle between the centers of the front and rear wheels of the vehicle in such a position and a direction as to cause movement of the mass upon an impact into the side of the vehicle. Additional mounting possibilities include in contact with a side door assembly of the vehicle and/or a side panel assembly of the vehicle between the centers of the front and rear wheels in such a position and a direction as to cause movement of the mass upon an impact into the side of the vehicle.

One embodiment of a side impact airbag system for a vehicle in accordance with the invention comprises an airbag housing defining an interior space, one or more inflatable airbags arranged in the interior space of the system housing such that when inflating, the airbag(s) is/are expelled from the airbag housing into the passenger compartment (along the side of the passenger compartment), and an inflator for inflating the airbag(s). The inflator usually comprises an inflator housing containing propellant. The airbag system also includes a crash sensor as described above for controlling inflation of the airbag(s) via the inflator upon a determination of a crash requiring inflation thereof, e.g., a crash into the side of the vehicle along which the airbag(s) is/are situated. The crash sensor may thus comprise a sensor housing arranged within the airbag housing, external of the airbag housing, proximate to the airbag housing and/or mounted on the airbag housing, and a sensing mass arranged in the sensor housing to move relative to the sensor housing in response to accelerations of the sensor housing resulting from, e.g., the crash into the side of the vehicle. Upon movement of the sensing mass in excess of a threshold value, the crash sensor controls the inflator to inflate the airbag(s). The threshold value may be the maximum motion of the sensing mass required to determine that a crash requiring deployment of the airbag(s) is taking place.

The crash sensor of this embodiment, or as a separate sensor of another embodiment, may be an electronic sensor and the movement of the sensing mass is monitored. The electronic sensor generates a signal representative of the movement of the sensing mass that may be monitored and recorded over time. The electronic sensor may also include a microprocessor and an algorithm for determining whether the movement over time of the sensing mass as processed by the algorithm results in a calculated value that is in excess of the threshold value based on the signal.

In some embodiments, the crash sensor also includes an accelerometer, the sensing mass constituting part of the accelerometer. For example, the sensing mass may be a micro-machined acceleration sensing mass, in which case, the electronic sensor includes a micro-processor for determining whether the movement of the sensing mass over time results in an algorithmic determined value which is in excess of the threshold value based on the signal. In the alternative, the accelerometer includes a piezo-electric element for generating a signal representative of the movement of the sensing mass, in which case, the electronic sensor includes a micro-processor for determining whether the movement of the sensing mass over time results in an algorithmic determined value which is in excess of the threshold value based on the signal.

The inflator may be any component or combination of components which is designed to inflate an airbag, preferably by directing gas into an interior of the airbag. One embodiment of the inflator may comprise a primer. In this case, the crash sensor includes an electronic circuit including the accelerometer and the primer such that if movement over time of the sensing mass results in a calculated value in excess of the threshold value, the electronic circuit is completed thereby causing ignition of the primer.

Another embodiment of a side airbag system in accordance with the invention includes an airbag arranged to deploy in the event of an impact into a side of the vehicle, a side impact crash sensor arranged to sense an impact into a side of the vehicle, and an inflator for inflating the airbag. The crash sensor is an electrical sensor which includes a movable sensing mass which moves when the side of the vehicle is impacted and a signal generating mechanism for generating a time-varying signal representative of movement of the sensing mass, analyzing the signal representative of the movement of the sensing mass and generating a deployment signal based thereon. The inflator is coupled to the crash sensor and receives the deployment signal therefrom and inflates the airbag upon receipt of the deployment signal. The signal generating mechanism may comprise a micro-processor which processes signals representative of the continuous movement of the sensing mass. The movement of the sensing mass may be recorded over time while the micro-processor includes an algorithm arranged to determine whether the movement of the sensing mass results in a calculated value which is in excess of a threshold value in order to generate the deployment signal. The electrical sensor may also comprise an accelerometer. The signal generating mechanism may comprise a strain gauge or a piezo-electric element. The airbag may be arranged around the inflator and the crash sensor may be arranged proximate the inflator.

A vehicle in accordance with the invention has a front, a rear, left and right sides and at least one door arranged on each of the left and right sides, an airbag arranged to deploy along the left or right side of the vehicle in the event of an impact into the left or right side of the vehicle, a side impact crash sensor arranged to sense an impact into the left or right side of the vehicle, and an inflator for inflating the airbag. The crash sensor, as well as the other components of the vehicle, may be as described above.

A method for protecting an occupant in a vehicle comprises arranging an airbag in the vehicle in a position to protect the occupant in the event of an impact into a side of the vehicle, sensing an impact into a side of the vehicle by continuously monitoring movement of a sensing mass to generate a time-varying signal representative of movement of the sensing mass and analyzing the signal representative of the movement of the sensing mass to generate a deployment signal based thereon, and directing the deployment signal to an inflator to cause the inflator to inflate the airbag. A micro-processor processes the signal representative of the movement of the sensing mass and optionally includes an algorithm arranged to determine whether the motion over time of the sensing mass results in a calculated value which is in excess of a threshold value in order to generate the deployment signal.

Although several preferred embodiments are illustrated and described above, there are possible combinations using other geometries, materials and different dimensions for the components that can perform the same function. For example, the biasing spring need not be the same as the biasing spring in the case of the implementation shown in FIG. 1 and a magnet might be used in place of a biasing spring for several of the mechanical cases illustrated. Therefore, this invention is not limited to the above embodiments and should be determined by the following claims.

The invention claimed is:

1. In a vehicle having a longitudinal axis between a front and rear of the vehicle such that a lateral direction is defined perpendicular to the longitudinal axis, the vehicle including a right side and a left side spaced apart in the lateral direction,
    a side impact airbag system comprising
        a side airbag arranged to deploy along the left or right side of the vehicle; and
        an electronic crash sensor comprising;
            a housing;
            a mass arranged within said housing in a position and direction so as to be movable in the lateral direction relative to said housing in response to lateral accelerations of said housing;
            a control mechanism for controlling deployment of said side airbag, said control mechanism being responsive to the motion of said mass only in the lateral direction,
            a microprocessor arranged to generate a signal based on the motion of said mass in the lateral direction which is used to determine whether said side airbag is deployed upon an impact into a side of said vehicle, and
            an algorithm for determining whether movement over time of said mass results in a calculated value which is in excess of a threshold value;
            said housing being mounted in such a position and a direction as to sense an impact into a side of said vehicle resulting in lateral acceleration of said housing.

2. The vehicle of claim 1, wherein said signal generated by said microprocessor is representative of the movement of said mass.

3. The vehicle of claim 1, wherein the right and left sides of the vehicle each include a door and said housing is arranged inside the door.

4. A vehicle, comprising
    a longitudinally extending outer skin arranged on a side of the vehicle;
    a system housing arranged inward of said outer skin and having an opening facing portion of a passenger compartment of the vehicle;
    an inflatable airbag arranged in said system housing;
    an inflator arranged in connection with the system housing; and
    an electronic sensor system for detecting an impact into a side of to the vehicle and comprising a sensor housing, a mass ranged in said sensor housing and movable relative to said sensor housing in response to acceleration and a microprocessor arranged to generate a signal based on the movement of said mass relative to said sensor housing direction which is used to determine whether said airbag is deployed upon an impact into a side of said vehicle, movement of said mass relative to said sensor housing providing an indication of a side impact for which deployment of said airbag is desired;
    said inflator being actuated in response to a detected side impact by said sensor system in order to expel said airbag through said opening into the passenger compartment, and
    wherein said sensor system is ranged such that said inflator is actuated and said airbag is inflated and expelled through said opening into the passenger compartment based on movement of said mass.

5. The vehicle of claim 4, further comprising an inner skin having a portion alongside the passenger compartment of the vehicle, said system housing being arranged between said outer and inner skins of the vehicle and said opening of said system housing being situated on an inward facing side of said system housing, said system housing being mounted such that said opening faces an outward facing surface of said inner skin alongside the passenger compartment.

6. The vehicle of claim 4, wherein said inflator is ranged at least partially within said system housing.

7. The vehicle of claim 4, wherein said inflator is arranged on a side of said system housing opposite the side on which said opening is formed.

8. The vehicle of claim 4, wherein said system housing includes a base wall having an aperture in which the inflator is partially received and flanged walls extending from edges of said base wall and forming said opening.

9. The vehicle of claim 4, wherein said inflator includes a plurality of gas orifices, said airbag being inflated by directing inflating gas through said orifices into said airbag.

10. The vehicle of claim 4, wherein said sensor system is arranged on a side of said system housing opposite the side on which said opening is formed.

11. The vehicle of claim 10, wherein said sensor system is arranged proximate said inflator or alongside said inflator.

12. The vehicle of claim 4, wherein said sensor system is arranged outside of and on said inflator.

13. The vehicle of claim 4, wherein said inflator includes a plurality of exit orifices around a periphery of said inflator and through which inflation fluid flows into said airbag, said inflator being arranged relative to said airbag such that a portion of said airbag surrounds a portion of said inflator.

14. The vehicle of claim 4, wherein said inflator includes a plurality of exit orifices through which inflation fluid flows into said airbag and a portion of said airbag is secured between said inflator and said system housing such that said exit orifices communicate with an interior of said airbag.

15. The vehicle of claim 4, wherein said system housing includes a base wall and said inflator includes a housing portion in which exit orifices are defined through which inflation fluid flows into said airbag, said airbag being secured between said base wall and said housing portion of said inflator such that said exit orifices communicate with an interior of said airbag.

16. A method for deploying a side airbag of a vehicle having an outer skin, comprising:
   providing a system housing having an opening;
   mounting the system housing with the opening facing a portion of a passenger compartment of the vehicle;
   arranging an inflatable airbag in the system housing;
   arranging an inflator in connection with the system housing;
   arranging a mass in a sensor housing and movable relative thereto;
   arranging a microprocessor to generate a signal based on the motion of the mass relative to the sensor housing and in response to acceleration;
   electronically sensing a side impact by analyzing the signal from the microprocessor;
   actuating the inflator in response to the detected side impact to expel the airbag through the opening in the system housing into the passenger compartment; and
   coupling the mass to the inflator such that the inflator is actuated always upon sensing of the side impact above a certain magnitude in a direction perpendicular to the outer skin of the vehicle.

17. The method of claim 16, further comprising arranging the system housing between the outer skin and an inner skin of the vehicle such that the opening of the system housing is on an inward facing side of the system housing, the system housing being mounted such that the opening faces an outward facing surface of the inner skin alongside the passenger compartment.

18. The method of claim 16, wherein the outer and inner skins form a door, further comprising arranging the system housing in the door.

19. The method of claim 16, further comprising:
   providing the inflator with a plurality of exit orifices round a periphery thereof and through which inflation fluid flows into the airbag; and
   arranging the inflator relative to the airbag such that a portion of the airbag surrounds a portion of the inflator.

20. The method of claim 16, further comprising:
   providing the inflator with a plurality of exit orifices trough which inflation fluid flows into the airbag; and
   securing a portion of the airbag between the inflator and the system housing such that the exit orifices communicate with an interior of the airbag.

21. The method of claim 16, wherein the system housing includes a base wall and the inflator includes a housing portion in which exit orifices are defined through which inflation fluid flows into the airbag, further comprising securing the airbag between the base wall and the housing portion of the inflator such that the exit orifices communicate with an interior of the airbag.

22. A vehicle, comprising:
   a longitudinally extending outer skin arranged on a side of the vehicle;
   a system housing arranged inward of said outer skin and having an opening facing a portion of a passenger compartment of the vehicle;
   an inflatable airbag arranged in said system housing;
   an inflator arranged in connection with the system housing; and
   an electronic sensor system for detecting an impact into a side of the vehicle and comprising a sensor housing, a mass arranged in said sensor housing and movable relative to said sensor housing in response to acceleration and a microprocessor arranged to generate a signal based on the movement of said mass relative to said sensor housing which is used to determine whether said airbag is deployed upon an impact into a side of said vehicle, movement of said mass relative to said sensor housing providing an indication of a side impact for which deployment of said airbag is desired;
   said inflator being actuated in response to a detected side impact by said sensor system in order to expel said airbag through said opening into the passenger compartment, and
   wherein said inflator is actuated directly by said sensor system whenever said sensor system provides an indication of the side impact in a direction perpendicular to said outer skin of the vehicle for which deployment of said airbag is desired.

23. The vehicle of claim 22, wherein said inflator includes a plurality of exit orifices around a periphery of said inflator and through which inflation fluid flows into said airbag, said inflator being arranged relative to said airbag such that a portion of said airbag surrounds a portion of said inflator.

24. The vehicle of claim 22, wherein said inflator includes a plurality of exit orifices through which inflation fluid flows into said airbag and a portion of said airbag is secured between said inflator and said system housing such that said exit orifices communicate with an interior of said airbag.

25. The vehicle of claim 22, wherein said system housing includes a base wall and said inflator includes a housing portion in which exit orifices are defined through which inflation fluid flows into said airbag, said airbag being secured between said base wall and said housing portion of said inflator such that said exit orifices communicate with an interior of said airbag.

26. In a vehicle having front and rear wheels and a longitudinal axis between a front and rear of the vehicle such that a lateral direction is defined perpendicular to the longitudinal axis, the vehicle also having left and right sides, a side impact airbag system comprising:
   an airbag and inflator assembly including
      an airbag housing,
      at least one inflatable airbag arranged in said airbag housing such that when inflating, said at least one airbag is expelled from said airbag housing into a passenger compartment of the vehicle; and
      a squib arranged to initiate inflation of said at least one airbag; and
   an electronic sensor system for controlling inflation of said at least one airbag upon a determination of a crash into the left or right side of the vehicle requiring inflation of said at least one airbag and including a sensor having a sensor housing arranged in a door or between inner and outer side panels along the left or right side of the vehicle and a movable sensing mass arranged within and movable in the lateral direction relative to said sensor housing in response to lateral accelerations of said sensor housing; and at least one electronic component responsive to the motion of said mass and arranged in a circuit with said squib for causing ignition of said squib, said at least one electronic component including a microprocessor arranged to generate a signal based on the motion of said mass which is used to determine whether said at least one airbag is deployed upon an impact into the left or right side of the vehicle;

said sensor housing being arranged in such a position and a direction in the door or between the inner and outer panels along the left or right side of the vehicle as to cause movement of said mass upon an impact into the left or right side of said vehicle resulting in lateral acceleration of said sensor housing.

27. The vehicle of claim 26, wherein said microprocessor contains an algorithm arranged to generate a time-varying signal representative of movement of said mass in the lateral direction, analyze the signal representative of the movement of said mass and generate a deployment signal based thereon.

28. The vehicle of claim 26, wherein said sensor housing is mounted onto a side door of the vehicle or onto a side of the vehicle between centers of front and rear wheels of the vehicle.

* * * * *

UNITED STATES PATENT AND TRADEMARK OFFICE
CERTIFICATE OF CORRECTION

PATENT NO. : 7,334,657 B2  Page 1 of 1
APPLICATION NO. : 11/467239
DATED : February 26, 2008
INVENTOR(S) : David S. Breed et al.

It is certified that error appears in the above-identified patent and that said Letters Patent is hereby corrected as shown below:

Column 20, line 18, insert --a-- between "facing" and "portion".

Column 20, line 25, change "ranged" to --arranged--.

Column 20, line 38, change "ranged" to --arranged--.

Column 20, line 50, change "ranged" to --arranged--.

Signed and Sealed this

Seventeenth Day of June, 2008

JON W. DUDAS
*Director of the United States Patent and Trademark Office*